US012739182B2

(12) United States Patent
Jin et al.

(10) Patent No.: US 12,739,182 B2
(45) Date of Patent: Sep. 15, 2026

(54) METHOD AND APPARATUS FOR RESOURCE ACTIVATION FOR BEAM FAILURE DETECTION IN WIRELESS COMMUNICATION SYSTEM

(71) Applicant: Samsung Electronics Co., Ltd., Suwon-si (KR)

(72) Inventors: Seungri Jin, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 420 days.

(21) Appl. No.: 18/328,141

(22) Filed: Jun. 2, 2023

(65) Prior Publication Data

US 2024/0007371 A1 Jan. 4, 2024

(30) Foreign Application Priority Data

Jul. 4, 2022 (KR) ........................ 10-2022-0081705

(51) Int. Cl.

*H04L 43/0811* (2022.01)
*H04L 5/00* (2006.01)
*H04W 76/20* (2018.01)

(52) U.S. Cl.

CPC ........ *H04L 43/0811* (2013.01); *H04L 5/0051* (2013.01); *H04W 76/20* (2018.02)

(58) Field of Classification Search

CPC . H04L 43/0811; H04L 5/0051; H04L 5/0048; H04W 76/20; H04W 72/231; H04W 76/19; H04W 24/08; H04B 7/0408; H04B 7/06964

See application file for complete search history.

(56) References Cited

U.S. PATENT DOCUMENTS

2021/0058805 A1 2/2021 Ji et al.
2022/0109547 A1 4/2022 Svedman et al.
2023/0328561 A1 10/2023 Jin et al.
2023/0345568 A1* 10/2023 Go ........................ H04W 76/19
2024/0098526 A1* 3/2024 Matsumura ........... H04L 5/0053
2024/0155387 A1* 5/2024 Harada ................. H04L 5/0048
2025/0150150 A1* 5/2025 Yuan ....................... H04L 5/001

FOREIGN PATENT DOCUMENTS

EP 4266593 A1 10/2023
KR 10-2022-0049397 * 4/2022 ............ H04W 76/19
KR 10-2023-0146386 A 10/2023

OTHER PUBLICATIONS

International Search Report and Written Opinion of the International Searching Authority dated Aug. 24, 2023, in connection with International Application No. PCT/KR2023/006960, 9 pages.

(Continued)

*Primary Examiner* — Ian N Moore
*Assistant Examiner* — Latresa A Mccallum

(57) ABSTRACT

The present disclosure relates to a 5G or 6G communication system for supporting a higher data transmission rate. Specifically, the present disclosure relates to a method and an apparatus for controlling beam failure detection.

16 Claims, 12 Drawing Sheets

(56) References Cited

OTHER PUBLICATIONS

3GPP TS 38.213 V17.2.0 (Jun. 2022), Technical Specification, 3rd Generation Partnership Project; Technical Specification Group Radio Access Network; NR; Physical layer procedures for control (Release 17), Jun. 2022, 256 pages.
Apple Inc, "On Multi-TRP Beam Management Enhancement," R1-2103091, 3GPP TSG-RAN WG1 Meeting #104b-e, e-Meeting, Apr. 12-20, 2021, 5 pages.
Ericsson, "Correction for feMIMO WI," R2-2206881, 3GPP TSG-RAN WG2 Meeting #118-e, Electronic, May 9-20, 2022, 1193 pages.
Intel Corporation, "Release-17 UE capabilities based on R1 and R4 feature lists (TS38.306)," R2-2206849, 3GPP TSG-RAN WG2 Meeting #118-e, Electronic meeting, May 9-20, 2022, 215 pages.
Supplementary European Search Report dated Jun. 25, 2025, in connection with European Patent Application No. 23835684.4, 16 pages.
Office Action dated Jul. 2, 2026, in connection with Indian Application No. 202417092593, 6 pages.

* cited by examiner (A) Case 1: Cell level BFD/BFR (B) Case 2: TRP level BFD/BFR

METHOD AND APPARATUS FOR RESOURCE ACTIVATION FOR BEAM FAILURE DETECTION IN WIRELESS COMMUNICATION SYSTEM

CROSS-REFERENCE TO RELATED APPLICATION

This application is based on and claims priority under 35 U.S.C. § 119 to Korean Patent Application No. 10-2022-0081705, filed Jul. 4, 2022, in the Korean Intellectual Property Office, the disclosure of which is incorporated by reference herein in its entirety.

BACKGROUND

1. Field

The present disclosure relates to a wireless communication system, and more particularly, to a method, an apparatus and/or a system for controlling beam failure detection (BFD) in the wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, as the wireless communication system advances as discussed above, a solution for seamlessly providing various services is required. In particular, a solution for efficiently controlling beam failure detection (BFD) for the communication is demanded.

SUMMARY

The present disclosure provides an apparatus and a method for effectively providing various service in a wireless communication system or a mobile communication system.

To support beam failure detection in a next generation mobile communication system which uses a beam, in particular, in a plurality of transmission reception points (TRPs), a terminal needs to be configured with beam resource information transmitted from a corresponding TRP, and to monitor the same. Specifically, the present disclosure suggests an operation associated with a media access control (MAC) control element (CE) which indicates resource activation for the beam failure detection at the plurality of the TRPs.

According to an embodiment of the present disclosure, a method performed by a terminal is provided. The method comprises: receiving, from a base station, a radio resource control (RRC) message configuring one or more beam failure detection (BFD) sets, wherein each of the one or more BFD sets includes at least one BFD reference signal (BFD-RS); in case that a number of a BFD-RS of a corresponding BFD set is smaller than or equal to a threshold value, identifying that the BFD-RS is activated for the corresponding BFD set; and in case that the number of the BFD-RS of the corresponding BFD set is larger than the threshold value, identifying that the BFD-RS is deactivated for the corresponding BFD set.

According to an embodiment of the present disclosure, a method performed by a base station is provided. The method comprises: transmitting, to a terminal, a radio resource control (RRC) message configuring one or more beam failure detection (BFD) sets, wherein each of the one or more BFD sets includes at least one BFD reference signal (BFD-RS); in case that a number of a BFD-RS of a corresponding BFD set is smaller than or equal to a threshold value, activating the BFD-RS for the corresponding BFD set; and in case that the number of the BFD-RS of the corresponding BFD set is larger than the threshold value, deactivating the BFD-RS for the corresponding BFD set.

According to an embodiment of the present disclosure, a terminal is provided. The terminal comprises: a transceiver; and a controller coupled with the transceiver and configured to: receive, from a base station, a radio resource control (RRC) message configuring one or more beam failure detection (BFD) sets, wherein each of the one or more BFD sets includes at least one BFD reference signal (BFD-RS), in case that a number of a BFD-RS of a corresponding BFD set is smaller than or equal to a threshold value, identify that the BFD-RS is activated for the corresponding BFD set, and in case that the number of the BFD-RS of the corresponding BFD set is larger than the threshold value, identify that the BFD-RS is deactivated for the corresponding BFD set.

According to an embodiment of the present disclosure, a base station is provided. The base station comprises: a transceiver; and a controller coupled with the transceiver and configured to: transmit, to a terminal, a radio resource control (RRC) message configuring one or more beam failure detection (BFD) sets, wherein each of the one or more BFD sets includes at least one BFD reference signal (BFD-RS), in case that a number of a BFD-RS of a corresponding BFD set is smaller than or equal to a threshold value, activate the BFD-RS for the corresponding BFD set, and in case that the number of the BFD-RS of the corresponding BFD set is larger than the threshold value, deactivate the BFD-RS for the corresponding BFD set.

According to embodiments of the present disclosure, it is possible to efficiently control beam failure to effectively and seamlessly provide various services in a wireless communication system or a mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
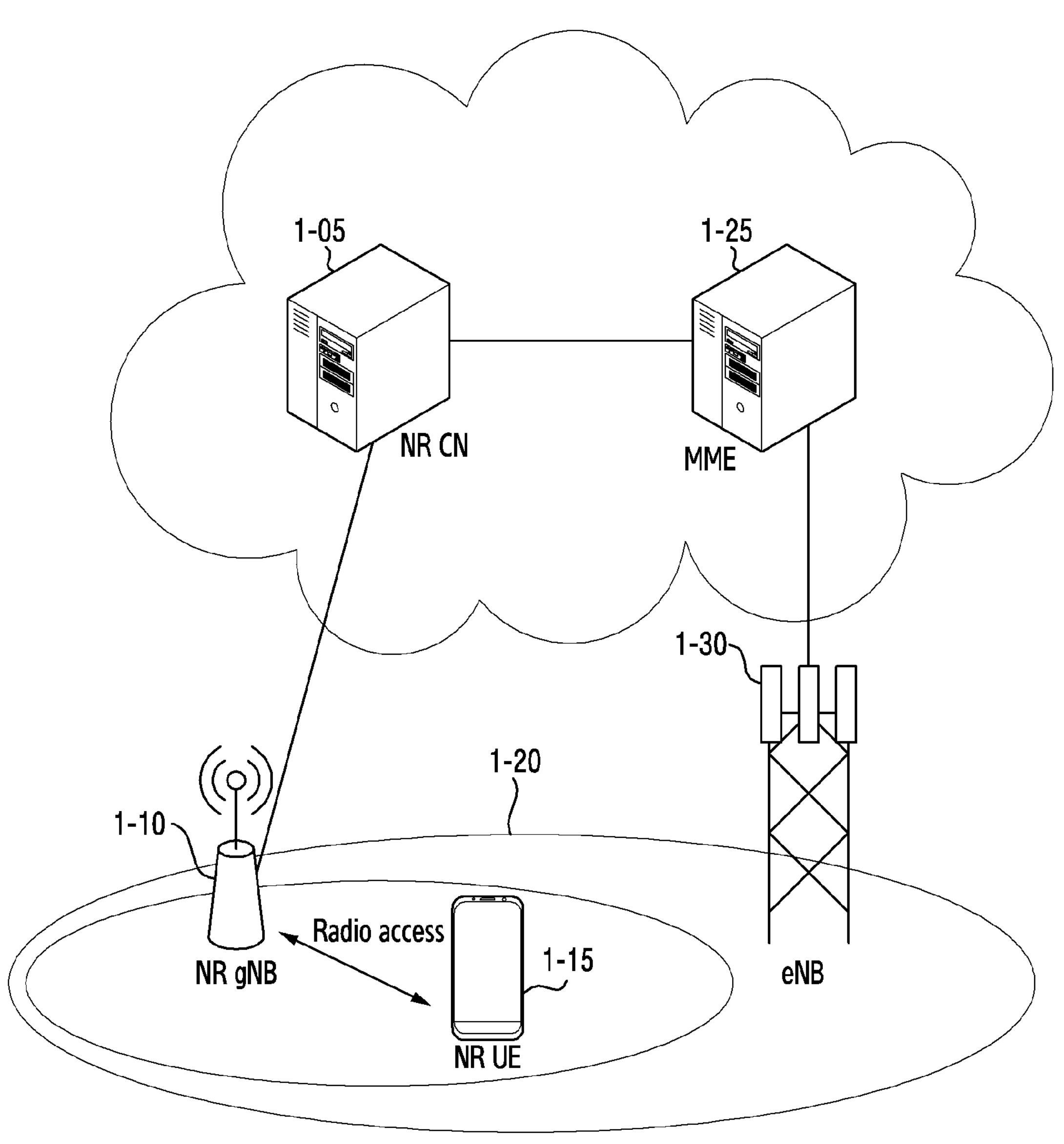
FIG. 1 illustrates a diagram of a mobile communication system structure to which the present disclosure is applied.

FIGS. 1 through 12, discussed below, and the various embodiments used to describe the principles of the present disclosure in this patent document are by way of illustration only and should not be construed in any way to limit the scope of the present disclosure. Those skilled in the art will understand that the principles of the present disclosure may be implemented in any suitably arranged system or device.

Hereinafter, embodiments of the present disclosure are described in detail with reference to the accompanying drawings. In this case, it is noted that like reference numerals denote like elements in the accompanying drawings. In addition, detailed descriptions related to well-known functions or configurations which may unnecessarily obscure the subject matter of the present disclosure shall be omitted.

In describing the embodiments, technical contents well known in the technical field to which the present disclosure pertains and which are not directly related to the present disclosure will be omitted in the specification. This is to more clearly provide the subject matter of the present disclosure by omitting unnecessary descriptions without obscuring the subject matter of the present disclosure.

For the same reason, some components in the accompanying drawings are exaggerated, omitted, or schematically illustrated. Also, a size of each component does not entirely reflect an actual size. The same reference number is given to the same or corresponding element in each drawing.

Advantages and features of the present disclosure, and methods for achieving them will be clarified with reference to embodiments described below in detail together with the accompanying drawings. However, the present disclosure is not limited to the embodiments disclosed below but may be implemented in various different forms, the embodiments are provided to only complete the scope of the present disclosure and to allow those skilled in the art to which the present disclosure pertains to fully understand a category of the present disclosure, and the present disclosure is solely defined within the scope of the claims. The same reference numeral refers to the same element throughout the specification.

At this time, it will be understood that each block of the process flowchart illustrations and combinations of the flowchart illustrations may be executed by computer program instructions. Since these computer program instructions may be mounted on a processor of a general purpose computer, a special purpose computer or other programmable data processing apparatus, the instructions executed by the processor of the computer or other programmable data processing equipment may generate means for executing functions described in the flowchart block(s). Since these computer program instructions may also be stored in a computer-usable or computer-readable memory which may direct a computer or other programmable data processing equipment to function in a particular manner, the instructions stored in the computer-usable or computer-readable memory may produce a manufacture article including instruction means which implement the function described in the flowchart block(s). Since the computer program instructions may also be loaded on a computer or other programmable data processing equipment, a series of operational steps may be performed on the computer or other programmable data processing equipment to produce a computer-executed process, and thus the instructions performing the computer or other programmable data processing equipment may provide steps for executing the functions described in the flowchart block(s).

In addition, each block may represent a portion of a module, a segment or code which includes one or more executable instructions for implementing a specified logical function(s). Also, it should be noted that the functions mentioned in the blocks may occur out of order in some alternative implementations. For example, two blocks shown in succession may in fact be executed substantially concurrently or the blocks may sometimes be executed in the reverse order depending on corresponding functionality.

At this time, the term '~unit' as used in the present embodiment indicates software or a hardware component such as a field programmable gate array (FPGA) or an application-specific integrated circuit (ASIC), and '~unit' performs specific roles. However, '~unit' is not limited to software or hardware. '~unit' may be configured to reside on an addressable storage medium and configured to reproduce on one or more processors. Accordingly, '~unit' may include, for example, components such as software components, object-oriented software components, class components and task components, processes, functions, attributes, procedures, sub-routines, segments of program code, drivers, firmware, microcode, circuitry, data, databases, data structures, tables, arrays, and variables. The functionalities provided in the components and '~unit' may be combined to fewer components and '~units' or may be further separated into additional components and '~units'. Further, the components and '~units' may be implemented to reproduce one or more central processing units (CPUs) within a device or a security multimedia card. Also, '~unit' in one embodiment may include one or more processors.

Terms for identifying access nodes, terms indicating network entities, terms indicating messages, terms indicating interfaces between network entities, and terms indicating various identification information used in the following description are illustrated only for convenience of description. Accordingly, the present disclosure is not limited to the terms to be described, and other terms having the same technical meaning may be used.

Hereafter, terms and names defined in a 3rd generation partnership project (3GPP) long term evolution (LTE) standard may be used for the convenience of description. However, the present disclosure is not limited by these terms and names, and may be applied in the same way to systems conforming to other standards.

Hereafter, a base station, which is an entity for performing resource allocation of a terminal, may be at least one of a next generation node B (gNB), an evolved node B (eNB), a Node B, a radio access unit, a base station controller, or a node on the network. The eNB may be interchangeably used with the gNB in the present disclosure to ease the explanation. That is, the base station described as the eNB may also indicate the gNB. A terminal may include a user equipment (UE), a mobile station (MS), a cellular phone, a smartphone, a computer, or a multimedia system for executing a communication function. Notably, the present disclosure is not limited to those examples.

In particular, the present disclosure may be applied to the 3GPP new radio (NR) (5G mobile communication standard). The present disclosure may be applied to intelligent services based on the 5G communication and internet of things (IoT) related technologies (e.g., smart home, smart building, smart city, smart car or connected car, health care, digital education, retail, security and safety services, etc.). Also, the term 'terminal' may indicate other wireless communication devices as well as narrowband (NB)-IoT devices and sensors.

A wireless communication system is evolving from its early voice-oriented service to, for example, a broadband wireless communication system which provides high-speed, high-quality packet data services according to communication standards such as high speed packet access (HSPA) of 3GPP, LTE or evolved universal terrestrial radio access (E-UTRA), LTE-advanced (A), LTE-Pro, high rate packet data (HRPD) of 3GPP2, ultra mobile broadband (UMB), and institute of electrical and electronics engineers (IEEE) 802.16e.

As a representative example of the broadband wireless communication system, the LTE system employs an orthogonal frequency division multiplexing (OFDM) scheme in a downlink (DL), and a single carrier frequency division multiple access (SC-FDMA) scheme in an uplink (UL). The UL indicates a radio link through which the terminal (or the UE) transmits data or a control signal to the base station (or the eNB, the gNB), and the DL indicates a radio link through which the base station transmits data or a control signal to the terminal. Such a multi-access scheme distinguishes data or control information of each user by assigning and operating time-frequency resources for carrying the data or the control information of each user not to overlap, that is, to establish orthogonality.

As a future communication system after the LTE, that is, the 5G communication system, which should be able to freely reflect various requirements of users and service providers, should support a service for simultaneously satisfying various requirements. Services considered for the 5G communication system includes enhanced mobile broadband (eMBB), massive machine type communication (mMTC), ultra reliability low latency communication (URLLC) and so on.

According to an embodiment, the eMBB aims to provide a faster data rate than a data rate supported by existing LTE, LTE-A or LTE-Pro. For example, the eMBB in the 5G communication system should be able to provide a peak data rate of 20 gigabits per second (Gbps) in the DL and 10 Gbps in the UL in terms of one base station. In addition, the 5G communication system should provide the peak data rate and concurrently provide an increased user perceived data rate of the terminal. To satisfy these requirements, improvements of various transmission and reception technologies are required, including a further advanced multi input multi output (MIMO) transmission technology. In addition, while signals are transmitted using a maximum 20 megahertz (MHz) transmission bandwidth in a 2 GHz band used by the LTE, the 5G communication system uses a frequency bandwidth wider than 20 MHz in the frequency band of 3~6 GHz or 6 GHz or higher, thus satisfying the required data rate in the 5G communication system.

At the same time, the 5G communication system is considering the mMTC to support application services such as IoT. The mMTC requires large-scale terminal access support in a cell, terminal coverage enhancement, improved battery time, and terminal cost reduction to efficiently provide the IoT. The IoT is attached to various sensors and various devices to provide communication functions and accordingly should be able to support a great number of terminals (e.g., 1,000,000 terminals/km 2) in the cell. In addition, the terminal supporting the mMTC is highly likely to be located in a shaded area not covered by the cell such as a basement of building due to its service characteristics, and thus may require wider coverage than other services provided by the 5G communication system. A terminal supporting the mMTC should be configured with a low-priced terminal, and may require a quite long battery lifetime such as 10~15 years because it is difficult to frequently replace the battery of the terminal.

Finally, the URLLC is a cellular-based wireless communication service used for mission-critical purposes, and may be used for robot or machinery remote control, industrial automation, unmanaged aerial vehicle, remote health care, emergency alert, or the like. Thus, the communication provided by the URLLC should provide very low latency (ultra-low latency) and very high reliability (ultra-high reliability). For example, a service supporting the URLLC should meet air interface latency smaller than 0.5 milliseconds and at the same time has requirements of a packet error rate below $10^{-5}$. Hence, for the service supporting the URLLC, the 5G system should provide a transmit time interval (TTI) smaller than other services, and concurrently requires design issues for allocating a wide resource in the frequency band to obtain communication link reliability.

The three services of the 5G communication system, that is, the eMBB, the URLLC, and the mMTC may be multiplexed and transmitted in one system. At this time, to satisfy the different requirements of the respective services, different transmission and reception schemes and transmission and reception parameters may be used between the services. Notably, the aforementioned mMTC, the URLLC, and the URLLC 5G are merely examples of the different service types, and the service type according to the present disclosure is not limited to those examples.

In addition, embodiments of the present disclosure may be explained with an LTE, LTE-A, LTE Pro, 5G (or NR), or 6G system as an example, but the embodiments of the present disclosure may be applied to other communication systems having similar technical backgrounds or channel forms. In addition, the present disclosure may also be applied to other communication systems through some modifications without significantly departing from the range of the present disclosure based on determination of those skilled in the technical knowledge.

FIG. 1 illustrates a diagram of a mobile communication system structure to which the present disclosure is applied.

Referring to FIG. 1, a radio access network of the next-generation mobile communication system includes an NR node B (an NR NB) 1-10 and an NR core network (NR CN) or a next generation core network (NG CN) 1-05. An NR UE or a terminal 1-15 accesses an external network via the NR NB 1-10 and the NR CN 1-05.

In FIG. 1, the NR NB 1-10 (or a gNB) corresponds to an eNB of the existing LTE system. The NR NB 1-10 may be connected to the NR UE 1-15 over a radio channel to provide a more advanced service than the existing Node B. Since every user traffic is served through a shared channel in the next generation mobile communication system, a device for performing scheduling by collecting state information of terminals (or UEs), such as a buffer status, an available transmission power state, and a channel state is required, which is managed by the NR NB 1-10. One NR NB generally controls a plurality of cells. To realize ultra-high-speed data transmission compared to the LTE system, a maximum bandwidth greater than the existing maximum bandwidth may be used and a beamforming technique may be employed in addition to the OFDM as a radio access technology. Also, an adaptive modulation & coding (AMC) which determines a modulation scheme and a channel coding rate based on the channel state of the UE is applied. The NR CN 1-05 performs functions such as mobility support, bearer setup, quality of service (QoS) setup. The NR CN 1-05 is a device which performs not only a mobility management function for the UE but also various control functions, and is connected to a plurality of base stations. The next-generation mobile communication system may also interwork with the existing LTE system, and the NR CN 1-105 is connected to a mobility management entity (MME) 1-25 through a network interface. The MME 1-25 is connected to an eNB 1-30 which is the existing base station.

Figure 2:
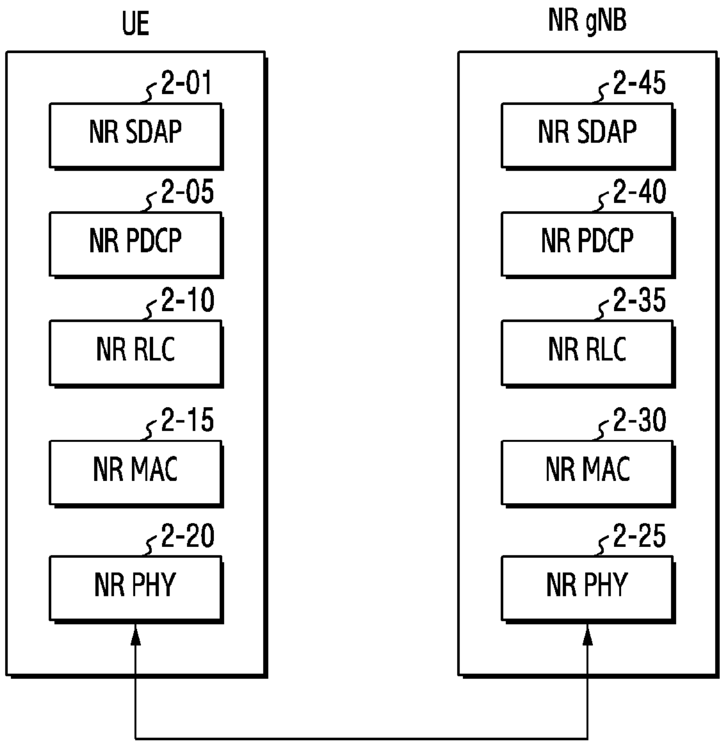
FIG. 2 illustrates a diagram of a radio protocol structure of a mobile communication system to which the present disclosure is applied.

FIG. 2 illustrates a diagram of a radio protocol structure of a mobile communication system to which the present disclosure is applied.

Referring to FIG. 2, a radio protocol of the next generation mobile communication system includes NR service data adaptation protocols (SDAPs) 2-01 and 2-45, NR packet data convergence protocols (PDCPs) 2-05 and 2-40, NR radio link controls (RLCs) 2-10 and 2-35, and NR MACs 2-15 and 2-30 respectively at a UE and an NR gNB.

Main functions of the NR SDAPs 2-01 and 2-45 may include some of the following functions.

- Transfer of user plane data
- Mapping between QoS flow and a data radio bearer (DRB) for both DL and UL
- Marking QoS flow ID in both DL and UL packets
- reflective QoS flow to DRB mapping for the UL SDAP protocol data units (PDUs)

For the SDAP layer device, the UE may be configured with whether to use a header of the SDAP layer device or whether to use functions of the SDAP layer device for each PDCP layer device, for each bearer, or for each logical channel through a radio resource control (RRC) message, and if the SDAP header is configured, a 1-bit non-access stratum (NAS) reflective QoS configuration indicator and a 1-bit AS reflective QoS configuration indicator of the SDAP header may instruct the UE to update or reconfigure mapping information of QoS flows and data bearers in the UL and the DL. The SDAP header may include QoS flow ID information indicating the QoS. The QoS information may be used as data processing priority, scheduling information, or the like to support seamless services.

Main functions of the NR PDCPs 2-05 and 2-40 may include some of the following functions.

- Header compression and decompression: robust header compression (ROHC) only
- Transfer of user data
- In-sequence delivery of upper layer PDUs
- Out-of-sequence delivery of upper layer PDUs
- PDCP PDU reordering for reception
- Duplicate detection of lower layer SDUs
- Retransmission of PDCP SDUs
- Ciphering and deciphering
- Timer-based SDU discard in uplink The reordering of the NR PDCP layer device indicates a function of reordering PDCP PDUs received from a lower layer based on a PDCP sequence number (SN), and may include a function of transmitting the reordered data to a higher layer, or may include a function of directly transmitting data without considering the order, a function of reordering and recording lost PDCP PDUs, a function of transmitting a status report of the lost PDCP PDUs to a transmitting side, and a function of requesting to retransmit the lost PDCP PDUs.

Main functions of the NR RLCs 2-10 and 2-35 may include some of the following functions.

- Transfer of upper layer PDUs
- In-sequence delivery of upper layer PDUs
- Out-of-sequence delivery of upper layer PDUs
- Error correction through automatic repeat request (ARQ)
- Concatenation, segmentation, and reassembly of RLC SDUs
- Re-segmentation of RLC data PDUs
- Reordering of RLC data PDUs
- Duplicate detection
- Protocol error detection
- RLC SDU discard
- RLC re-establishment The in-sequence delivery of the NR RLC layer device indicates a function of transferring RLC SDUs received from a lower layer to a higher layer in sequence. If one original RLC SDU is divided into a plurality of RLC SDUs and received, the in-sequence delivery of the NR RLC layer device may include a function of reassembling and transmitting them, a function of reordering the received RLC PDUs based on an RLC SN or a PDCP SN, a function of reordering and recording lost RLC PDUs, a function of transmitting a status report of the lost RLC PDUs to the transmitting side, and a function of requesting to retransmit the lost RLC PDUs. If there is a lost RLC SDU, the in-sequence delivery of the NR RLC layer device may include a function of transmitting only the RLC SDUs prior to the lost RLC SDU to a higher layer in sequence, or if there is a lost RLC SDU but a designated timer expires, may include a function of transmitting all RLC SDUs received before the timer start to the higher layer in sequence, or if there is a lost RLC SDU but a designated timer expires, may include a function of transmitting all RLC SDUs received so far to a higher layer in sequence. In addition, the RLC PDUs may be processed in their reception order (in order of arrival, regardless of the serial number or the SN), and transmitted to the PDCP layer device out-of-sequence delivery, and segments stored in a buffer or to be received may be received and reconstructed into one complete RLC PDU, and then processed and transmitted to the PDCP layer device. The NR RLC layer may not include a concatenation function, and this function may be performed in the NR MAC layer or replaced by a multiplexing function of the NR MAC layer.

The out-of-sequence delivery of the NR RLC layer device indicates a function of directly transmitting RLC SDUs received from a lower layer to a higher layer regardless of the sequence, and if one original RLC SDU is divided into a plurality of RLC SDUs and received, may include a function of reassembling and transmitting them, and may include a function of storing and ordering RLC SNs or PDCP SNs of the received RLC PDUs and thus recording lost RLC PDUs.

The NR MACs 2-15 and 2-30 may be connected to a plurality of NR RLC-layer devices configured in one UE, and main functions of the NR MAC may include some of the following functions.

- Mapping between logical channels and transport channels
- Multiplexing/demultiplexing of MAC SDUs
- Scheduling information reporting
- Error correction through hybrid ARQ (HARM)
- Priority handling between logical channels of one UE
- Priority handling between UEs by means of dynamic scheduling
- multimedia broadcast multicast services (MBMS) service identification
- Transport format selection
- Padding NR PHYs 2-20 and 2-25 may channel-code and modulate upper layer data and convert the data into OFDM symbols and transmit the OFDM symbols over a radio channel, or demodulate OFDM symbols received over the radio channel and channel-decode and transmit the OFDM symbols to an upper layer.

Figure 3:
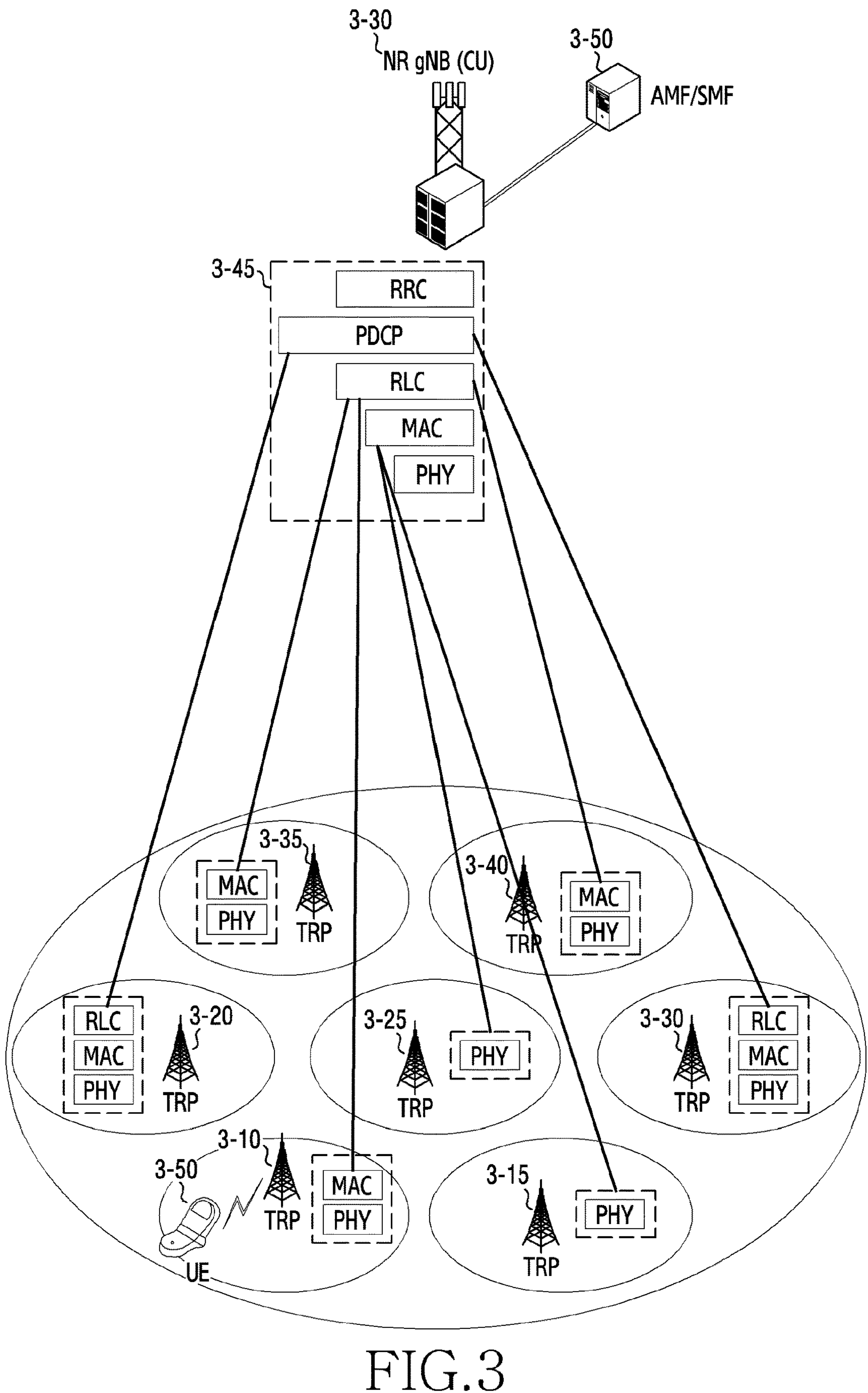
FIG. 3 illustrates a diagram of another mobile communication system structure to which the present disclosure is applied.

FIG. 3 illustrates a diagram of another next generation mobile communication system structure to which the present disclosure is applied.

Referring to FIG. 3, a cell served by an NR gNB 3-05 operating based on a beam may include multiple transmission reception points (TRPs) 3-10, 3-15, 3-20, 3-25, 3-30, 3-35 and 3-40. The TRPs 3-10 through 3-40 represent blocks in which some function of transmitting and receiving a physical signal in the existing NR eNB is separated, and include a plurality of antennas. The NR gNB 3-05 may be expressed as a central unit (CU) and the TRP may be expressed as a distributed unit (DU). Functions of the NR gNB 3-05 and the TRP may be configured by separating each layer from the PDCP/RLC/MAC/PHY layer as shown in 3-45. That is, the TRP may have only the PHY layer and perform functions of the corresponding layer 3-15 and 3-25, the TRP may have only the PHY layer and the MAC layer and perform functions of the corresponding layers 3-10, 3-35, and 3-40, and the TRP may have only the PHY layer, the MAC layer, and the RLC layer and perform functions of the corresponding layers 3-20 and 3-30. In particular, the TRPs 3-10 through 3-40 may use a beamforming technique for transmitting and receiving data by generating narrow beams in several directions using a plurality of transmit and receive antennas. A UE 3-50 accesses the NR gNB 3-05 and an external network via the TRPs 3-10 through 3-40. The NR gNB 3-05 collects and schedules status information such as buffer status, available transmission power status, and channel status of the UEs to service users, and supports connections between the UEs and a CN, particularly, between an access and mobility management function (AMF)/session management function (SMF) 3-50.

In the present disclosure, the TRP is based on the structure 3-15 and 3-25 having only the PHY layer to perform the functions of the corresponding layer.

Improvement of the MIMO operation in the next generation mobile communication system, particularly, frequency range 2 (FR2) for transmitting data using the beam requires a method for measuring and reporting a plurality of beams, a method for selecting and using an optimal beam for data transmission and reception, a method for measuring and recovering beam failure of a current beam, and so on.

Hereafter, the present disclosure basically explains the above methods, and additionally suggests their detailed operations. In particular, the present disclosure provides a technique for improving operations related to beam failure detection (BFD) and beam failure recovery (BFR).

Conventional BFD and BFR may be divided into special cell (SpCell) BFR and secondary cell (SCell) BFR, and the two methods perform cell-specific BFD/BFR in common. The two methods are different in their subsequent operation, depending on a cell of the BFD/BFR, which may be summarized in brief as below.

- SCell BFR
  - If the BFD occurs in a specific SCell, the UE transmits a BFR MAC CE through a UL resource
  - If the UL resource for transmitting the BFR MAC CE is not sufficient, a scheduling request (SR) for the BFR transmission is triggered (SR configuration and physical uplink control channel (PUCCH) resource are configured at the gNB on a cell basis)
  - BFR MAC CE configuration: SCell(s) information of beam failure, candidate beam indicator, candidate beam identifier
  - BFR procedure is completed if receiving a physical downlink control channel (PDCCH) addressed by a cell (C)-radio network temporary identifier (RNTI)
- SpCell BFR
  - If the BFD occurs in the SpCell, the UE triggers a random access procedure, and transmits a messageA (msgA) or a msg3 including a BFR MAC CE
  - BFR MAC CE configuration: SpCell beam failure indicator, candidate beam indicator, candidate beam identifier
  - BFR procedure is completed if receiving the PDCCH addressed by the C-RNTI The following embodiment of the present disclosure explains the BFD/BFR operations at a plurality of TRPs and refers to the SCell BFD/BFR and the SpCell BFD/BFR for the comparison. Some of the aforementioned operations may be omitted in the reference for the operation comparison, but it is specified at the beginning of the specification of the present disclosure that the operations are applied.

In the present disclosure, FR1 indicates 410 MHz~7125 MHz where the NR system operates, and the FR2, which is a method for transmitting a radio resource using a directional beam, covers all of 24250 MHz~52600 MHz and the extended FR2 52600 MHz~71000 MHz.

Figure 4:
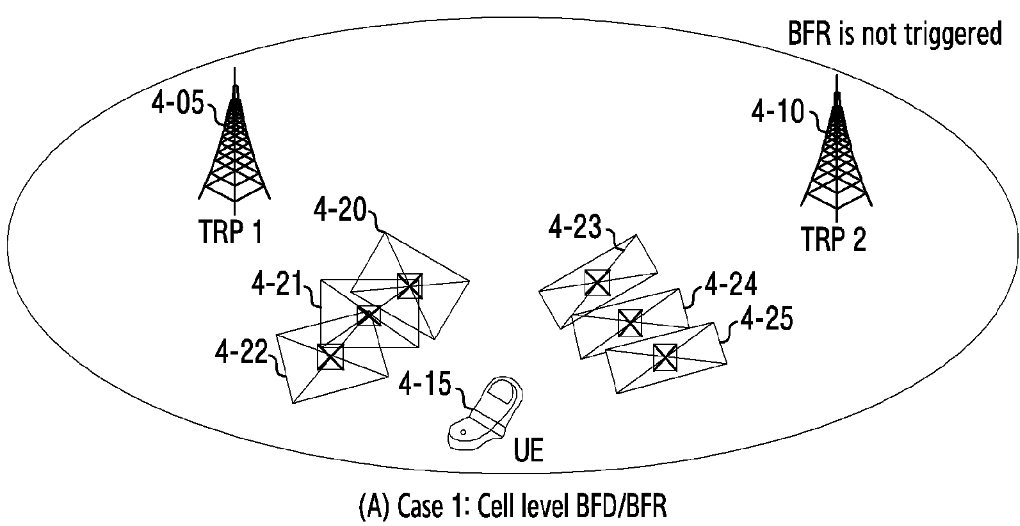
FIG. 4 illustrates a diagram of scenarios of cell level and transmission reception point (TRP) level beam failure detection/recovery procedures in a next generation mobile communication system to which the present disclosure is applied.
Figure 4:
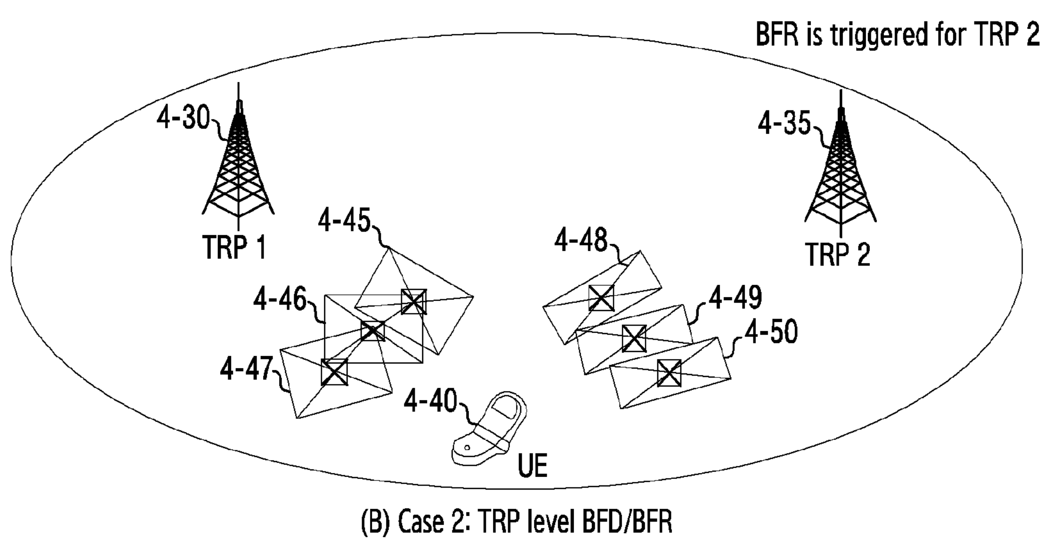

FIG. 4 illustrates a diagram of scenarios of cell level and TRP level beam failure detection/recovery procedures in a next generation mobile communication system to which the present disclosure is applied.

In FIG. 4, a conventional cell level BFD/BFR scenario (A (case 1) of FIG. 4) and the TRP level BFD/BFR scenario (B (case 2) of FIG. 4) are explained in comparison. The two scenarios may include the plurality of the TRPs in common, but the cell level BFD/BFR scenario performs the BFD/BFR on a cell basis whereas the TRP level BFD/BFR scenario performs the BFD/BFR on a TRP basis.

First, the cell level BFD/BFR scenario A shall be summarized in brief as follows.

A first TRP 4-05 and a second TRP 4-10 may exist in one serving cell, and a UE 4-15 may perform a multi-TRP operation according to base station configuration. In this case, the multi-TRP operation indicates UL/DL transmission and reception (PDCCH/physical downlink shared channel (PDSCH)/PUCCH/physical uplink shared channel (PUSCH) resource transmission and reception) via the plurality of the TRPs, and may include one or more improvement schemes such as transmission configuration indicator (TCI) state configuration, single downlink control information (DCI) based PDSCH transmission through multi-TRPs, and multi-DCI based PDSCH transmission via multi-TRPs.

In addition, beam configuration through the multiple TRPs may be applied to configure the cell level BFD/BFR and the UE performs its operation according to the corresponding configuration. That is, a resource list (e.g., list of BFD reference signal (RS)) for the serving cell level/unit BFD may be provided, and the UE monitors a BFD resource set configured for the BFD in the corresponding serving cell. Also, a candidate beam RS list is also provided to the UE together with the configuration, to allow the UE to report an available beam in BFR report. Referring to FIG. 4, the BFR is not triggered even if the beam failure occurs in every beam 4-23, 4-24 and 4-25 allocated to a specific TRP (herein, the second TRP 4-10) among BFD resources 4-20 through 4-25 configured for the UE. Since one beam 4-21 is effective among the beams 4-20, 4-21 and 4-22 of the first TRP 4-05 as shown in FIG. 4, the effective beam exists in view of the corresponding serving cell and accordingly the service is provided through the corresponding beam without triggering the BFR.

In the conventional system, only the cell level BFD and BFR is allowed, but according to the TRP level BFD and BFR, if beam failure is detected in every beam of the specific TRP, the BFD is reported to the gNB for the TRP level.

That is, a first TRP 4-30 and a second TRP 4-35 may exist in one serving cell, and a UE 4-40 may perform a multi-TRP operation according to base station configuration. The present disclosure illustrates the scenario where the plurality of the TRPs exists in one serving cell, but the TRPs may belong to different cells in this scenario. Namely, the first TRP may be belong to a first serving cell, and the second TRP may be belong to a second serving cell. Unlike the serving cell level/unit BFD/BFR scenario, the TRP level/unit BFD/BFR scenario may separately configure BFD resources to monitor through each TRP and the candidate beam RS list.

TRP 1 dedicated BFD RS list, candidate beam RS list

TRP 2 dedicated BFD RS list, candidate beam RS list

The UE independently monitors the BFD resources configured per TRP, and triggers the TRP level BFR if all the BFD RS resources of the specific TRP fail. Referring to FIG. 4, the TRP level BFR is triggered if the beam failure occurs in every beam 4-48, 4-49 and 4-50 allocated to a specific TRP (herein, the second TRP 4-35) among BFD resources 4-45 through 4-50 configured for the UE. Since one beam 4-46 is effective among the beams 4-45, 4-46 and 4-47 of the first TRP 4-30 as shown in FIG. 4, the effective beam exists in the corresponding first TRP and accordingly the service is provided through the corresponding beam without triggering the BFR. By contrast, with respect to the second TRP, the UE reports the failure of every beam of the corresponding TRP to the gNB, and if detecting an effective candidate beam RS in the corresponding process, transmits it together. Hence, the gNB may improve the transmission and reception to the terminal through the TRP level beam.

Figure 5:
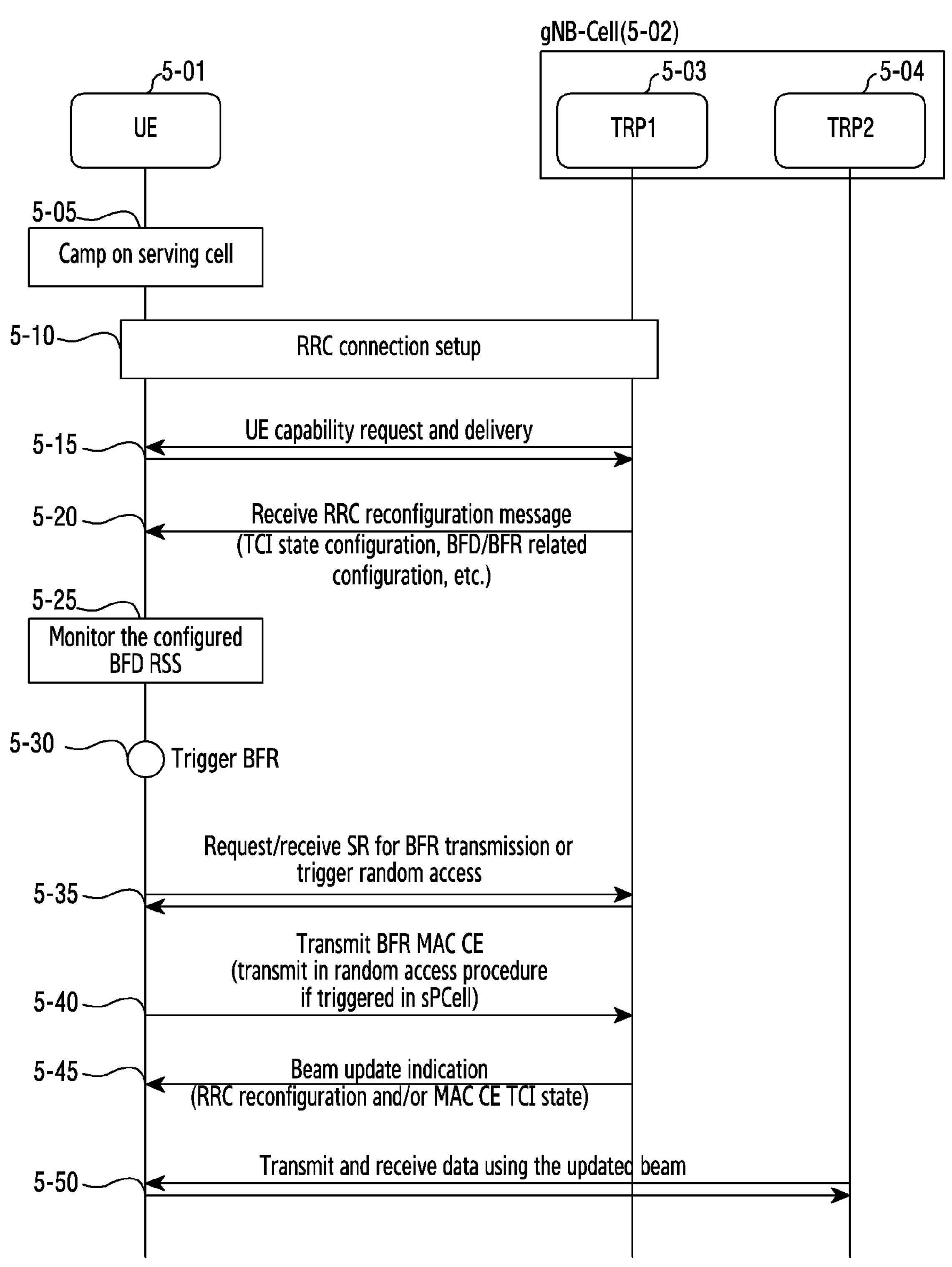
FIG. 5 illustrates a diagram of cell level beam failure detection and recovery procedures with multiple TRPs adopted in a new radio (NR) system, referenced in the present disclosure.

FIG. 5 illustrates a diagram of cell level BFD/BFR procedures with multiple TRPs adopted in an NR system, referenced in the present disclosure. FIG. 5 corresponds to a specific procedure of the cell level BFD/BFR scenario which is the scenario A described in FIG. 4.

A UE 5-01 in an idle mode RRC_IDLE is camping on (or camps on) a corresponding gNB 5-02 to search for an adequate cell in operation 5-05, and accesses the gNB or a primary cell (PCell) 5-02 because of occurrence of data to transmit in operation 5-10. Herein, the gNB 5-02 may include a plurality of TRPs 5-03 and 5-04. In the idle mode, a network is not connected for UE power saving and no data may be transmitted, and transition to a connected mode RRC_CONNECTED is required for the data transmission. The UE camping on as mentioned above indicates that the UE resides in a corresponding cell and receives a paging message to determine whether data is received in the DL. If successfully accessing the gNB 5-02, the UE is transited to the connected mode RRC_CONNECTED and the UE in the connected mode may transmit and receive data to and from the gNB.

The gNB and the UE in the RRC_CONNECTED mode perform a procedure for acquiring UE capability in operation 5-15. That is, the gNB transmits a UE capability enquiry message to the UE, and performs the UE capability enquiry by filtering UE capabilities required by the corresponding gNB. The UE receives UE capabilities supported by the UE within the enquiry range of the corresponding gNB and transmits them to the gNB using a UE capability information message.

In operation 5-20, the gNB transmits to the UE an RRC reconfiguration message including configuration information of the corresponding gNB. The RRC message may include configurations RadioLinkMonitoringConfig, beamFailureRecoverySCellConfig, and beamFailureRecoveryConfig for the cell level BFD/BFR, and associated measurement resource configuration and TCI state configuration are given.

In operation 5-25, the UE monitors BFD resources configured for the BFD of the corresponding serving cell, by applying a list of BFD RS configuration for the serving cell level/unit BFD received in the RRC message. In operation 5-30, if determining failure of all of the monitored BFD RSs (if the corresponding BFD RS indicates beam failure exceeding beamFailureInstanceMaxCount while beamFailureDetectionTimer operates), the UE triggers the BFR.

In operation 5-35, if an UL resource for transmitting an SCell BFR MAC CE, the UE transmits an SR to the gNB and receives a UL grant for the request. If the SCell BFR is not triggered in the corresponding operation but SpCell (PCell or primary secondary cell group (SCG) cell (PSCell)) BFR is triggered, the random access is triggered in the corresponding operation. This operation is omitted if the UL resource for carrying the SCell BFR MAC CE from the UE exists.

In operation 5-40, the UE generates a BFR MAC CE including the triggered BFR information, and transmits it to the gNB. If the SpCell (PCell or PSCell) BFR is triggered, the UE transmits a msgA (for 2step random access)/msg3 (for 4step random access) including the BFR MAC CE in the random access procedure. In operation 5-45, the gNB may reconfigure an adequate beam for the UE by referring to the BFR MAC CE information received from the UE. This operation may be performed through TCI state configuration change in the RRC message and DL TCI state change through the MAC CE. In operation 5-50, the UE performs data transmission and reception with the gNB over the beam recovered through the reconfiguration.

Figure 6:
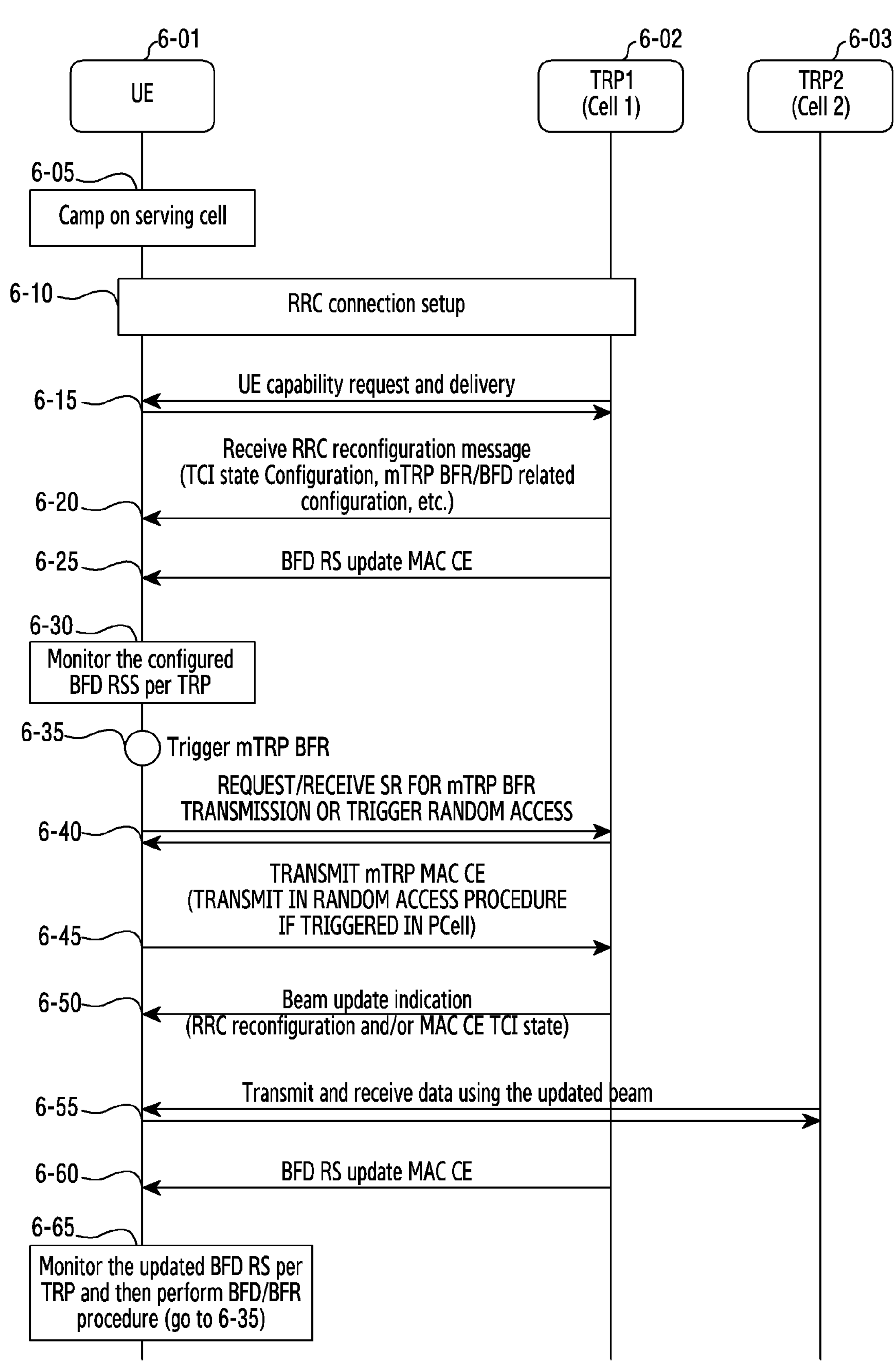
FIG. 6 illustrates a diagram of TRP level beam failure detection and recovery procedures with multiple TRPs adopted in an NR system, applied to the present disclosure.

FIG. 6 illustrates a diagram of TRP level BFD/BFR procedures with multiple TRPs adopted in an NR system, applied to the present disclosure. FIG. 6 corresponds to a specific procedure of the TRP level BFD/BFR scenario which is the scenario B described in FIG. 4.

A UE 6-01 in the idle mode RRC_IDLE is camping on (or camps on) a corresponding gNB 6-02 to search for an adequate cell in operation 6-05, and accesses the gNB or a PCell 6-02 because of occurrence of data to transmit in operation 6-10. Herein, the gNB 6-02 may include a plurality of TRPs, but each serving cell may include each TRP (Cell 1—TRP 1, 6-02; Cell 2—TRP 2, 6-03) as shown in FIG. 6 and perform an inter-cell multiple TRP operation. In the idle mode, a network is not connected for UE power saving and no data may be transmitted, and transition to the connected mode RRC_CONNECTED is required for the data transmission. Camping indicates that the UE resides in a corresponding cell and receives a paging message to determine whether data is received in the DL. If successfully accessing the gNB 6-02, the UE transits to the connected mode RRC_CONNECTED and the UE in the connected mode may transmit and receive data to and from the gNB.

In the RRC_CONNECTED mode, the gNB and the UE perform a procedure for acquiring UE capability in operation 6-15. That is, the gNB transmits a UE capability enquiry message to the UE, and performs the UE capability enquiry by filtering UE capabilities required by the corresponding gNB. The UE receives UE capabilities supported by the UE within the enquiry range of the corresponding gNB and transmits them to the gNB using a UE capability information message. In this operation, the UE may indicate whether to support an operation of activating a BFD RS set through a MAC CE if performing the BFD via the multiple TRPs. In this operation, the UE may indicate a maximum number of BFD RS resources configurable per TRP, and thus indicate capability of activating the BFD RS set through the MAC CE in the BFD. If the UE does not indicate the corresponding capability, the gNB may configure only up to two BFD RS resources per TRP for the UE.

In operation 6-20, the gNB transmits to the UE an RRC reconfiguration message including configuration information of the corresponding gNB. The RRC message may include configurations RadioLinkMonitoringConfig, beamFailureRecoverySCellConfig, and beamFailureRecoveryConfig for the TRP level BFD/BFR, and associated measurement resource configuration and TCI state configuration are given. Particularly, the corresponding operation differs from FIG. 5 in that the BFD/BFR is managed per TRP and RadioLinkMonitoringConfig and BeamFailureRecoveryRSConfig may be configured for the multiple TRPs (two TRPs) as described below.

independent BFD RS set configuration for two TRPs (BFD RS set for TRP1, BFD RS set for TRP2; failureDetectionSet1, failureDetectionSet2 in RadioLinkMonitoringConfig)

BeamFailureDetectionSet-r17 includes BFD RS resources configured per TRP, and includes timer and counter values required to monitor the BFD and to trigger the BFR.

BeamLinkMonitoringRS-r17 provides the BFD RS actually configured, which may indicate a synchronization signal block (SSB) resource and a channel state information (CSI) RS resource, and may include identifiers for identifying corresponding resources. Up to 64 resources may be configured according to the UE capability (to be elucidated in operation 10-15).

If BFD RS sets for two TRPs are configured, existing cell level BFD RS configuration may not be provided (the following configuration in ASN.1 may be conditional and the corresponding condition may be added. Alternatively, its corresponding description may be added to field description).

BeamFailureRecoveryRSConfig including candidate beam RS List information (candidateBeamRSList, candidateBeamRSList2) for the two TRPs In operation 6-25, the gNB may transmit to the UE a BFD RS activation/update MAC CE to the UE to indicate update information of the resource list (List of BFD RS for TRP1 and TRP2) configuration for the TRP level/unit BFD configured with the RRC. The MAC CE transmission is always possible, and it is necessary to clarify a UE operation prior to receiving the corresponding MAC CE in terms of the UE. The following embodiment suggests detailed operations thereof.

Features of the present disclosure are applied to corresponding operations. If receiving the MAC CE in this operation, the UE initializes its BFR related parameter BFI COUNTER value to 0, and cancels the BFR of the ongoing BFD RS set. This is to initialize the BFR procedure of the ongoing BFD RS before receiving the MAC CE because the BFD RS applied to measure the BFD of the corresponding TRP is updated. If receiving the BFD RS update MAC CE, the UE applies it after an "X" slot from a slot in which a transport block (TB) including the corresponding MAC CE is received. Herein, the "X" slot may be a value defined in the standard, and may be a value given through the RRC configuration. The value may be given in a symbol or definite time unit (e.g., millisecond) other than the slot.

In operation 6-30, the UE monitors BFD resources per TRP configured for the BFD of the specific TRP, by applying the resource list (List of BFD RS for TRP1 and TRP2) for the TRP level/unit BFD received in the RRC message or the MAC CE. In operation 6-35, if determining failure in all of the BFD RSs monitored per TRP (if the corresponding BFD RS indicates beam failure exceeding beamFailureInstanceMaxCount while beamFailureDetectionTimer operates), the UE triggers the BFR of the corresponding TRP. In operation 6-40, if an UL resource for transmitting the BFR MAC CE per TRP, the UE transmits an SR to the gNB and receives a UL grant for the request. If the SCell BFR is not triggered in the corresponding operation but SpCell (PCell or PSCell) BFR is triggered, the random access is triggered in the corresponding operation. This operation is omitted if the UL resource for carrying the BFR MAC CE per TRP from the UE exists.

In operation 6-45, the UE generates a BFR MAC CE (hereafter, used together with a multi TRP (mTRP) BFR MAC CE) including BFR information of the triggered TRP, and transmits it to the gNB. If the SpCell (PCell or PSCell) BFR is triggered, the UE transmits a msgA (for 2step random access)/msg3 (for 4step random access) including the mTRP BFR MAC CE in the random access procedure. In operation 6-50, the gNB may reconfigure an adequate beam for the UE by referring to the BFR MAC CE information received from the UE. This operation may be performed through TCI state configuration change in the RRC message and DL TCI state change through the MAC CE. In operation 6-55, the UE performs data transmission and reception with the gNB over the beam recovered through the reconfiguration.

In operation 6-60, since the BFD RS configuration to be measured by the UE per TRP may change according to the changed beam configuration, the gNB retransmits the MAC CE for the BFD RS activation/update to the UE. If receiving the MAC in this operation, the UE initializes its BFR related parameter BFI COUNTER value to 0, and cancels the BFR of the ongoing BFD RS set (or initializes the value BFI COUNTER to 0 and cancels the BFR of the ongoing BFD RS set if receiving the beam change from the gNB in operation 6-50). This is to initialize the BFR procedure of the ongoing BFD RS before receiving the MAC CE because the BFD RS applied to measure the BFD of the corresponding TRP is updated. If receiving the BFD RS update MAC CE, the UE applies it after an "X" slot from a slot receiving a TB including the corresponding MAC CE. Herein, the "X" slot may be the value defined in the standard, and may be a value given through the RRC configuration. The value may be given in a symbol or definite time unit (e.g., millisecond) other than the slot. The beam update indication MAC CE 6-50 and the BFD update MAC CE 6-60 may be included and transmitted in one MAC PDU in base station implementation.

In operation 6-65, the UE monitors the updated BFD RS per TRP and then performs the BFD/BFR procedure. That is, the UE performs an operation after operation 6-35.

The present disclosure provides the plurality of (up to 64) BFD RS configurations to be measured by the UE per TRP through the RRC configuration, and then dynamically activating and updating up to two BFD RSs to be measured by UE for the BFD per TRP through the MAC CE. Particularly, providing the BFD RS resource per TRP through the RRC configuration differs depending on the UE capability (BFD RS set activation MAC CE operation support). That is, if the UE has capability for the BFD RS set activation MAC CE operation support, the gNB may configure for the UE up to 64 BFD RSs to be measured per TRP for the BFD, and if the UE has no capability for the BFD RS set activation MAC CE operation support, the gNB may configure for the UE up to two BFD RSs to be measured per TRP for the BFD. In this case, the UE applies and monitors the BFD RS resource configure with the RRC.

By contrast, if the UE has the capability for the BFD RS set activation MAC CE operation support and the gNB supports it and configures a plurality of BFD RS resources, the UE may identify resources to be actually monitored by receiving the activation through the MAC CE. However, the following issues should be additionally considered.

1. Issue 1: it is necessary to clarify when the BFD RS set activation/update MAC CE (or, the BFD RS indication MAC CE) is transmitted.
   For example, whether the MAC is transmitted even if BFD RS sets configured by the RRC for the two TRPs are two or less.
   For example, whether the MAC is transmitted even if only one BFD RS set is configured by the RRC configuration for the two TRPs.
2. Issue 2: operations of whether and how the UE performs the BFD before receiving the BFD RS set activation/update MAC CE are required.

Hereafter, embodiments of the present disclosure suggest definite UE operations for the two issues described above, and thus clarify the UE operations. In addition, the present disclosure provides the following solutions for the above issues. First, solutions for the issue 1 are described.

1. Solution 1-1: Although the UE supports the BFD RS indication MAC CE, the gNB transmits the corresponding MAC CE only if the number of the BFD RSs exceeds two in any of the BFD RS sets configured per TRP.
   For example, if BFD RSs exceeding two (>2) are configured in one BFD RS set and two or less (<=2) BFD RSs are configured in another BFD RS set, signaling related to the BFD RS indication for the BFD RS set configured with the two or less BFD RSs is omitted from the MAC CE. That is, with respect to the BFD RS set configured by the RRC with two or less BFD RSs, octets including the BFD RS IDs of the MAC CE format may be skipped in a MAC CE described in FIG. 7 (octets containing BFD RS IDs of set with <=2 BFD RSs is skipped in MAC CE).
   In this case, the UE regards that the BFD RSs of the omitted BFD RS set are activated.
2. Solution 1-2: If the UE supports the BFD RS indication MAC CE, the gNB transmits the corresponding MAC CE only if the number of the BFD RSs exceeds 1 in any of the BFD RS sets configured per TRP.
   For example, if BFD RSs exceeding 1 (>1) are configured in one BFD RS set and one BFD RS is configured in another BFD RS set, signaling related to the BFD RS indication for the BFD RS set configured with the one BFD RS is omitted from MAC CE. That is, with respect to the BFD RS set configured by the RRC with the one BFD RS, the octets including the BFD RS IDs of the MAC CE format may be omitted in the MAC described in FIG. 7 (octets containing BFD RS IDs of set with 1 BFD RSs is skipped in MAC CE).
   In this case, the UE regards that the BFD RSs of the omitted BFD RS set are activated.
   A difference from the solution 1-1 lies in that, although two BFD RSs are initially configured through the RRC, the gNB may indicate only one BFD RS through the MAC CE and accordingly the UE determines the BFD RS to monitor by receiving the MAC CE even if the number of the BFD RSs for the BFD RS set exceeds 1.
3. Solution 1-3: If the UE supports the BFD RS indication MAC CE, the gNB always transmits the corresponding MAC CE.
   That is, regardless of the number of the BFD RSs in the BFD RS set, the UE always waits for the MAC CE.
   In this case, if the gNB configures two or less BFD RSs in the BFD RS set, a solution for the UE to determine whether to wait for the MAC CE is required. For example, the RRC configuration may provide a 1-bit indicator.

Next, solutions for the issue 2 are described.

1. Solution 2-1: The UE does not perform the BFD operation until receiving the BFD RS indication MAC CE from the gNB. That is, the UE performs the BFD operation after receiving the BFD RS indication MAC CE and the BFD RS being indicated.
   In this case, a time gap may occur between the RRC configuration and the MAC CE signaling.
   In the implementation, the gNB may transmit the RRC configuration message and the BFD RS indication MAC CE in the same MAC PDU. However, due to a difference of an RRC processing time and a MAC CE processing time, the received message may be stored in a buffer of the UE and processed after every message is decoded.
2. Solution 2-2: The RRC configuration indicates the BFD RS to be initially monitored by the UE.
   For example, one or two BFD RSs having the low indexes in the BFD RS list per BFD RS set provided by the initial RRC configuration are set to the BFD RSs to be initially monitored.
   In this case, corresponding clarification may be added to the specification. In this case, the UE operation may be clearly defined all the time by adding the explicit operation in the RRC specification.

3. Solution 2-3: The UE monitors the activated TCI state with the BFD RS.
   That is, it operates the same as in the case where the BFD RS is not configured. In this case, related UE operations may be always defined clearly.

Figure 7:
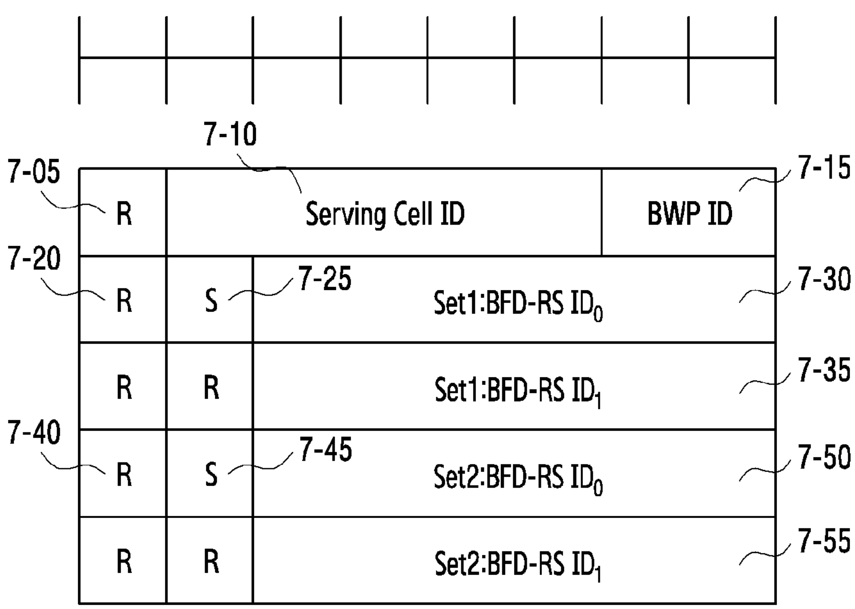
FIG. 7 illustrates a diagram of a media access control (MAC) control element (CE) structure for activating/updating a beam failure detection (BFD) reference signal (RF) per TRP referenced in the present disclosure.

FIG. 7 illustrates a diagram of a MAC CE structure for BFD RS activation/update per TRP referenced in the present disclosure.

By providing specific resource information of BFD RSs to be monitored by the UE in the MAC CE for the BFD RS activation and update per TRP, the UE may perform the BFD RS activation and update per TRP.

The following RRC configuration is applied as aforementioned in FIG. 6.

- separate BFD RS set configuration for two TRPs (BFD RS set for TRP1, BFD RS set for TRP2; failureDetectionSet1, failureDetectionSet2 in RadioLinkMonitoringConfig)
  - BeamFailureDetectionSet-r17 includes BFD RS resources configured per TRP, and includes timer and counter values required to monitor the BFD and to trigger the BFR.
  - BeamLinkMonitoringRS-r17 provides the BFD RS actually configured, which may indicate the SSB resource and the CSI RS resource, and may include identifiers beamLinkMonitoringRS-Id-r17 for identifying corresponding resources. Up to 64 resources may be configured according to the UE capability (to be elucidated in operation 10-15).
  - If BFD RS sets for two TRPs are configured, the existing cell level BFD RS configuration may not be provided (the following configuration in ASN.1 may be conditional and the corresponding condition may be added. Alternatively, its corresponding description may be added to the field description).
- BeamFailureRecoveryRSConfig including candidate beam RS List information (candidateBeamRSList, candidateBeamRSList2) for the two TRPs Now, the BFD RS activation/update MAC CE structure for multiple TRPs shall be described in FIG. 7. The BFD RS activation/update MAC CE for the multiple TRPs suggested in FIG. 7 may include at least the following fields.

- Reserved bits (7-05, 7-20, 7-40): detailed description of the reserved bits is omitted in the drawing
- Serving cell ID (5 bits; 7-10): a serving cell identifier to which the information indicated in the corresponding MAC CE is applied
- BWP ID (2 bits; 7-15): a BWP identifier of the serving cell to which the information indicated in the corresponding MAC CE is applied
- S (1 bit; 7-25, 7-45): an identifier indicating whether there is a BF RS ID activated second. If the corresponding bit indicates 1, there are two activated BFD RS IDs for one BFD RS set. If the corresponding bit indicates 0, there is one activated BFD RS ID for one BFD RS set.
- BFD RS ID for TRP1 (7-30, 7-35): a BFD RS resource identifier actually indicating the UE to monitor, among the BFD RS resources for the TRP1 configured by the RRC, and mapped to beamLinkMonitoringRS-Id-r17 configured in the RRC. Up to two BFD RS resources are indicated.
- BFD RS ID for TRP2 (7-50, 7-55): a BFD RS resource identifier actually indicating the UE to monitor, among the BFD RS resources for the TRP2 configured by the RRC, and mapped to beamLinkMonitoringRS-Id-r17 configured in the RRC. Up to two BFD RS resources are indicated.

The BFD RS activation/update MAC CE for the multiple TRPs described in the drawing has a new enhanced logical channel identifier (eLCID) value, and may be distinguished through the determined eLCID in a MAC PDU subheader. In addition, the BFD RS activation/update MAC CE for the multiple TRPs basically includes one or two BFD RS sets.

Figure 8:
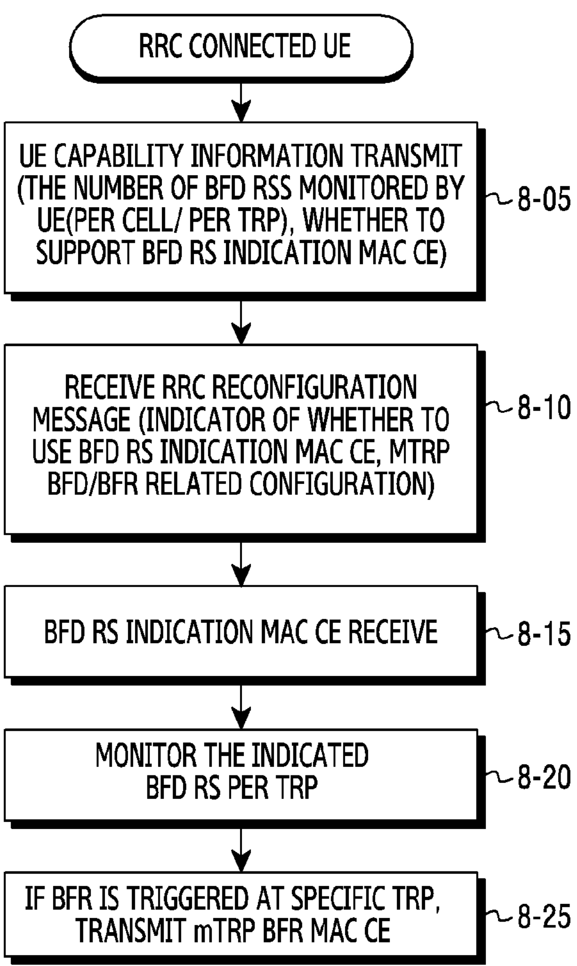
FIG. 8 illustrates a diagram of a method of a terminal for receiving a BFD RS set per TRP from a base station and performing BFD RS monitoring when receiving a BFD RS indication MAC CE according to an embodiment of the present disclosure.

FIG. 8 illustrates a diagram of a method for performing BFD RS monitoring if a terminal receives a BFD RS set per TRP, and a BFD RS indication MAC CE from a base station, according to an embodiment of the present disclosure.

The embodiment herein adopts the solutions 1-1, 1-2, and 1-3 and the solution 2-1 for the issues 1 and the issue 2 respectively to address in the present disclosure.

The UE transmits UE capability to the gNB in operation 8-05. That is, the gNB first transmits a UE capability enquiry message to the UE, and requests the UE capability by filtering UE capabilities required by the gNB. The UE receives UE capabilities supported by the UE within the enquiry range of the corresponding gNB and transmits them to the gNB using a UE capability information message. In this operation, the UE may indicate whether to support the operation (BFD RS indication MAC CE) for activating the BFD RS set through the MAC CE if performing the BFD via the multiple TRPs. In this operation, the UE may indicate the maximum number of the BFD RS resources configurable per TRP, and thus indicate the capability for activating the BFD RS to actually monitor by receiving the BFD RS set through the MAC CE if performing the BFD. If the UE does not indicate the corresponding capability, the gNB may provide up to two BFD RS resources per TRP to the UE via the RRC configuration. That is, the BFD RS indication MAC CE is not used.

In operation 8-10, the UE in the RRC connected mode receives from the gNB an RRC reconfiguration message including configuration information of the corresponding gNB. The RRC message may include configurations (e.g., RadioLinkMonitoringConfig, beamFailureRecoverySCellConfig, and beamFailureRecoveryConfig) for the TRP based BFD/BFR, and associated measurement resource configuration and TCI state configuration are given. Details related to this configuration shall be described in FIG. 10. In particular, operation 8-10 configures a plurality of BFD RS sets (i.e., multiple TRPs) and BFD RSs of the corresponding BFD RS sets, among the BFD/BFR related configuration for the multiple TRPs. The number of the BFD RSs configurable in the corresponding BFD RS set may be determined by the gNB in association with the UE capability. In addition, an indicator (1 bit) indicating whether or not the gNB uses the BFD RS indication MAC CE may be added to the corresponding message. As discussed in the issue 1, if the gNB provides two or less BFD RSs for each BFD RS set through the RRC configuration, the UE may not know whether the corresponding gNB applies the BFD RS indication MAC CE. Since the BFD monitoring operation may differ in terms of the UE depending on whether the BFD RS indication MAC CE is applied, the corresponding 1-bit indicator may be usefully used.

In operation 8-15, the UE receives the BFD RS indication MAC CE from the gNB. One feature of the embodiment herein is that the UE does not perform the BFD RS monitoring until the corresponding operation, that is, until receiving the BFD RS indication MAC CE. All of the solutions 1-1, 1-2, and 1-3 may be applied to the issue 1, and operations per case if the solution 2-1 is applied are briefly described.

1. Case 1: If the solution 1-1 is applied and the solution 2-1 is applied,

BFD RSs exceeding two are configured in at least one or more BFD RS sets among the BFD RS sets per TRP through the RRC configuration, and the UE does not monitor the RRC configured BFD RS resource but monitors BFD RS after receiving the BFD RS indication MAC CE.

if two or less (<=2) BFD RSs are configured in the BFD RS set, signaling related to the BFD RS indication of the BFD RS set in which two or less BFD RSs are configured in the MAC CE is omitted, and accordingly the BFD RS resource configured in the RRC is monitored upon receiving the MAC CE though corresponding content is omitted. Alternatively, the UE may monitor the corresponding resource upon the RRC configuration.

2. Case 2: If the solution 1-2 is applied and the solution 2-1 is applied,

BFD RSs exceeding 1 are configured in at least one or more BFD RS sets among the BFD RS sets per TRP through the RRC configuration, and the UE does not monitor the RRC configured BFD RS resource but monitors BFD RS after receiving the BFD RS indication MAC CE.

if one BFD RS is configured in the BFD RS set, signaling related to the BFD RS indication of the BFD RS set in which one BFD RS is configured in the MAC CE is omitted and accordingly the UE monitors the BFD RS resource configured in the RRC upon receiving the MAC CE though corresponding content is omitted. Alternatively, the corresponding resource may be monitored upon the RRC configuration.

3. Case 3: If the solution 1-3 is applied and the solution 2-1 is applied,

The UE does not monitor the RRC configured BFD RS resource, but monitors the BFD RS after receiving the BFD RS indication MAC CE.

In operation 8-20, the UE monitors the BFD RS resources indicated per TRP in operation 8-15. In this operation, up to two BFD RS resources may be monitored per TRP, and then the BFD RS resource to monitor may be changed by receiving the BFD RS indication MAC CE. In operation 8-25, if the monitored BFD RS resource satisfies a BFR triggering condition, the UE triggers the mTRP BFR, and generates and reports an mTRP BFR MAC CE to the gNB. Detailed operations thereof are provided in FIG. 6.

Figure 9:
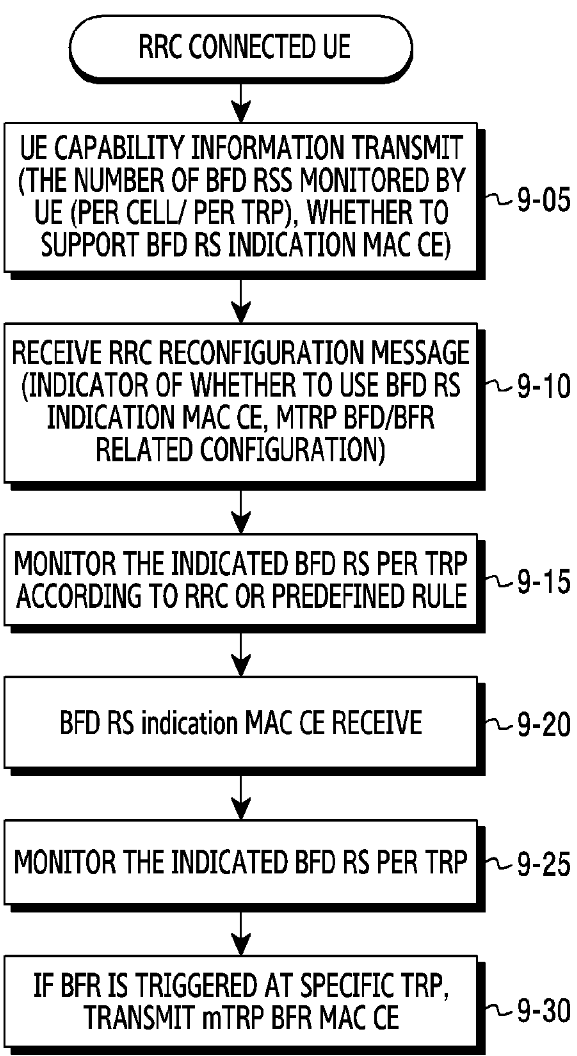
FIG. 9 illustrates a diagram of a method of a terminal for receiving a BFD RS set per TRP from a base station and performing BFD RS monitoring before receiving a BFD RS indication MAC CE according to an embodiment of the present disclosure.

FIG. 9 illustrates a diagram of a method for receiving a BFD RS set per TRP, and performing BFD RS monitoring before a terminal receives a BFD RS indication MAC CE from a base station, according to an embodiment of the present disclosure.

The embodiment herein adopts the solutions 1-1, 1-2, and 1-3 and the solutions 2-2 and 2-3 for the issues 1 and the issue 2 respectively to address in the present disclosure.

The UE transmits UE capability to the gNB in operation 9-05. That is, the gNB first transmits a UE capability enquiry message to the UE, and requests the UE capability by filtering UE capabilities required by the corresponding gNB. The UE receives UE capabilities supported by the UE within the enquiry range of the corresponding gNB and transmits them to the gNB using a UE capability information message. In this operation, the UE may indicate whether to support the operation (BFD RS indication MAC CE) for activating the BFD RS set through the MAC CE in performing the BFD via the multiple TRPs. In this operation, the UE may indicate the maximum number of the BFD RS resources configurable per TRP, and thus indicate the capability for activating the BFD RS to actually monitor by receiving the BFD RS set through the MAC CE if performing the BFD. If the UE does not indicate the corresponding capability, the gNB may provide up to two BFD RS resources per TRP to the UE via the RRC configuration. That is, the BFD RS indication MAC CE is not used.

In operation 9-10, the UE receives from the gNB an RRC reconfiguration message including configuration information of the corresponding gNB, the RRC message may include configurations (e.g., RadioLinkMonitoringConfig, beamFailureRecoverySCellConfig, and beamFailureRecoveryConfig) for the TRP based BFD/BFR, and associated measurement resource configuration and TCI state configuration are given. Details related to this configuration shall be described in FIG. 10. In particular, the corresponding operation configures a plurality of BFD RS sets (i.e., multiple TRPs) and the BFD RSs of the corresponding BFD RS set, among the BFD/BFR related configuration for the multiple TRPs. The number of the BFD RSs configurable in the corresponding BFD RS set may be determined by the gNB in association with the UE capability. In addition, an indicator (1 bit) indicating whether or not the gNB uses the BFD RS indication MAC CE may be added to the corresponding message. As discussed in the issue 1, if the gNB provides two or less BFD RSs for each BFD RS set through the RRC configuration, the UE may not know whether the corresponding gNB applies the BFD RS indication MAC CE. Since the BFD monitoring operation may differ in terms of the UE depending on whether the BFD RS indication MAC CE is applied, the corresponding 1-bit indicator may be usefully used.

In operation 9-15, the UE initially monitors some of the BFD RSs provided per TRP according to the RRC configuration or a predefined rule. For example, one or two BFD RSs having low indexes in the BFD RS list per BFD RS set provided by the initial RRC configuration are set to the BFD RSs to initially monitor. Corresponding clarification may be added to the specification, and the UE operation may be clearly defined all the time, by adding an explicit operation in the RRC. Alternatively, the UE monitors the activated TCI state with the BFD RS as described in the solution 2-3. That is, the UE operates the same as in not configuring the BFD RS.

In operation 9-20, the UE receives the BFD RS indication MAC CE from the gNB. One feature of the embodiment herein is that the UE performs the BFD RS monitoring according to a separate rule even if not receiving the BFD RS indication MAC CE before the corresponding operation, and, after receiving the BFD RS indication MAC CE, conforms to it. All of the solutions 1-1, 1-2, and 1-3 may be applied to the issue 1, and operations per case if the solutions 2-2 and 2-3 are applied are briefly described.

1. Case 1: If the solution 1-1 is applied and the solutions 2-2 and 2-3 are applied, BFD RSs exceeding two are configured in at least one or more BFD RS sets among the BFD RS sets per TRP through the RRC configuration, and the UE monitors the RRC configured BFD RS resources and monitors BFD RSs indicated after receiving the BFD RS indication MAC CE.

if two or less (<=2) BFD RSs are configured in the BFD RS set, signaling related to the BFD RS indication of the BFD RS set in which two or less BFD RSs are configured in the MAC CE is omitted from MAC CE, and accordingly the BFD RS resource configured in the RRC is monitored upon receiving the MAC CE although corresponding content is omitted.

Alternatively, the corresponding resource may be monitored upon the RRC configuration.

2. Case 2: If the solution 1-2 is applied and the solutions 2-2 and 2-3 are applied,
   BFD RSs exceeding 1 are configured in at least one or more BFD RS sets among the BFD RS sets per TRP through the RRC configuration, and the UE monitors the RRC configured BFD RS resources and monitors BFD RS indicated after receiving the BFD RS indication MAC CE.
   if one BFD RS is configured in the BFD RS set, signaling related to the BFD RS indication of the BFD RS set in which one BFD RS is configured in the MAC CE is omitted from the MAC CE, and accordingly the BFD RS resource configured in the RRC is monitored upon receiving the MAC CE although corresponding content is omitted. Alternatively, the corresponding resource may be monitored upon the RRC configuration.
3. Case 3: If the solution 1-3 is applied and the solutions 2-2 and 2-3 are applied,
   the UE monitors the RRC configured BFD RS resource and monitors the BFD RS indicated after receiving the BFD RS indication MAC CE.

In operation 9-25, the UE monitors the BFD RS resources per TRP indicated in operation 9-15/8-20. In the corresponding operation, up to two BFD RS resources may be monitored per TRP, and then the BFD RS resource to monitor may be changed by receiving the BFD RS indication MAC CE. In operation 9-30, if the monitored BFD RS resource satisfies a BFR triggering condition, the UE triggers the mTRP BFR, and generates and reports an mTRP BFR MAC CE to the gNB. Detailed operations thereof are provided in FIG. 6.

Figure 10:
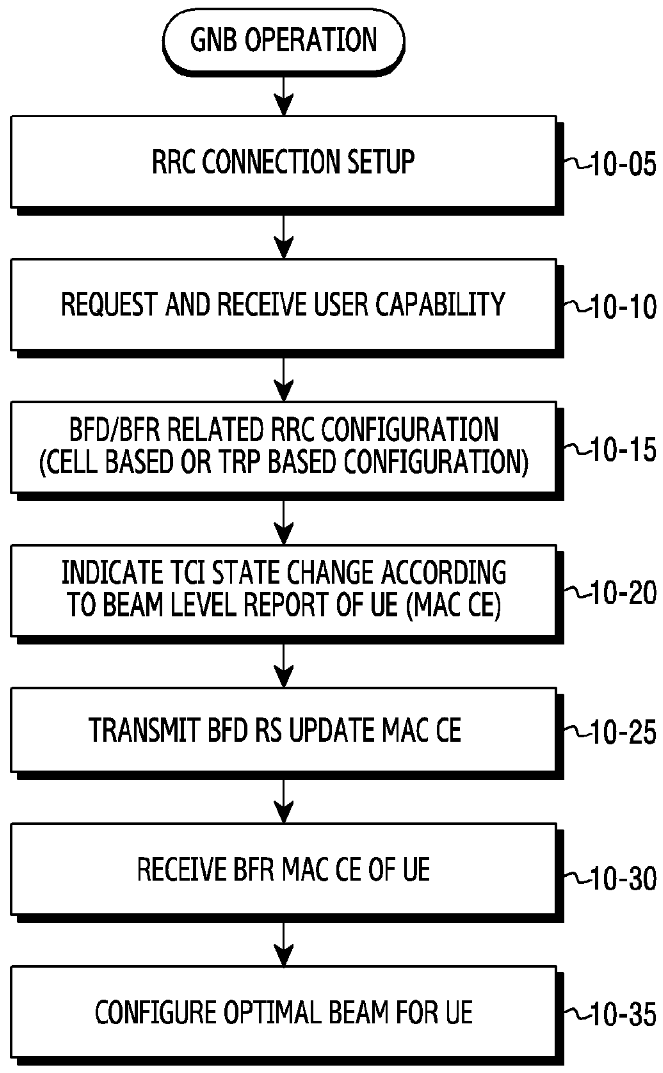
FIG. 10 illustrates a diagram of operations of a base station to which embodiments of the present disclosure are applied.

FIG. 10 illustrates a diagram of operations of a base station to which embodiments of the present disclosure are applied.

The gNB may establish an RRC connection state with the UE in operation 10-05, request UE capability from the UE in operation 10-10, and receive corresponding UE capability information. The gNB may analyze the UE capability received in the above operation and determine whether the corresponding UE supports the mTRP BFD/BFR, and obtain the number of BFD RS resources to monitor. In addition, the gNB identifies whether the UE supports the BFD RS indication MAC CE. If identifying the corresponding UE capability, the gNB transmits to the corresponding UE an RRC reconfiguration message including the cell level BFD/BFR configuration and the TRP level BFD/BFR configuration in operation 10-15. The UE receives the RRC reconfiguration message including cell group configuration information CellGroupConfig and configuration information ServingCellConfig for configuring a plurality of serving cells. The RRC message includes configuration information PDCCH-Config and PDSCH-Config for reception over the PDCCH and the PDSCH, and beam configuration for PUCCH resource transmission is also included in PUCCH-Config. In more detail, BWP configuration BWP-Uplink and BWP-Downlink, control resource set (CORESET) configuration, scrambling configuration, TCI state (TCI-State in PDSCH-Config) configuration, PUCCH resource and PUCCH resource set, spatial relation info, and so on may be included. Particularly, the TCI state related configuration is provided per DL BWP per serving cell and included in PDCCH-Config and PDSCH-Config each, and PUCCH resource configuration and beam configuration for corresponding resource transmission are also included in PUCCH-Config. The PUCCH configuration may configure PUCCH resource, PUCCH resource set, spatial relation info, and the like.

In the corresponding operation, multiple TRPs may be configured and may include configurations (e.g., RadioLinkMonitoringConfig, beamFailureRecoverySCellConfig, beamFailureRecoveryConfig) related to the BFD and the BFR for the multiple TRPs. In this regard, the description in FIG. 6 may be applied. Particularly, the difference from the configuration (FIG. 5) of the cell level BFD/BFR support in the corresponding operation is that the BFD/BFR is managed per TRP and accordingly RadioLinkMonitoringConfig and beamFailureRecoverySCellConfig may be configured for the multiple (two) TRPs. In addition, the gNB may provide existing TCI state configuration in relation to the TCI state, or may apply unified TCI state configuration. The unified TCI state configuration is a method for collectively managing beams of a plurality of cells, rather than allocating the TCI state based on the cell, and is a framework for inter-cell beam management. The BFD/BFR operations via the multiple TRPs may apply the two TCI state frames in the present disclosure, and the beam index and the indication method used in the BFD/BFR via the TRP differ depending on the applied configuration.

Although not depicted in FIG. 10, after transmitting the RRC message, the gNB may transmit a BFD RS update MAC CE for the TRP to the UE. This may be always specified as the RRC configuration in the standard to transmit the BFD RS indication MAC CE following the RRC configuration message, if the BFD/BFR configuration for the TRP is provided, or the corresponding BFD RS indication MAC CE may be included after the RRC configuration or omitted in the base station implementation. The corresponding BFD RS indication MAC CE may be omitted if the RRC reconfiguration provides the BFD/BFR configuration for the TRP, particularly, if information or a rule of the BFD RS to be monitored after the UE receives the RRC message is provided.

In operation 10-20, the gNB may indicate the TCI state change, that is, the beam change through the MAC CE according to a beam level measurement report value received from the UE. Next, if it is necessary to change the BFD RSs to be monitored by the UE according to the changed beam, the gNB may transmit the BFD RS update MAC CE of the TRP in operation 10-25. Operation 10-20 and operation 10-25 may be integrated in the base station implementation and one MAC PDU including two MAC CEs may be transmitted.

In operation 10-30, the gNB may receive an mTRP BFR MAC CE from the UE, and identify that the BFR occurs at a specific TRP. The MAC CE may be transmitted (sPCell BFR) during the random access, or transmitted (SCell BFR) in the connected state through an uplink resource. The gNB may obtain from the mTRP BFR MAC CE received from the UE that the BFR occurs at the TRP of a specific serving cell, and obtain effective candidate beam information for the corresponding TRP, and thus apply it to optimal beam change indication for the UE in operation 10-35.

Figure 11:
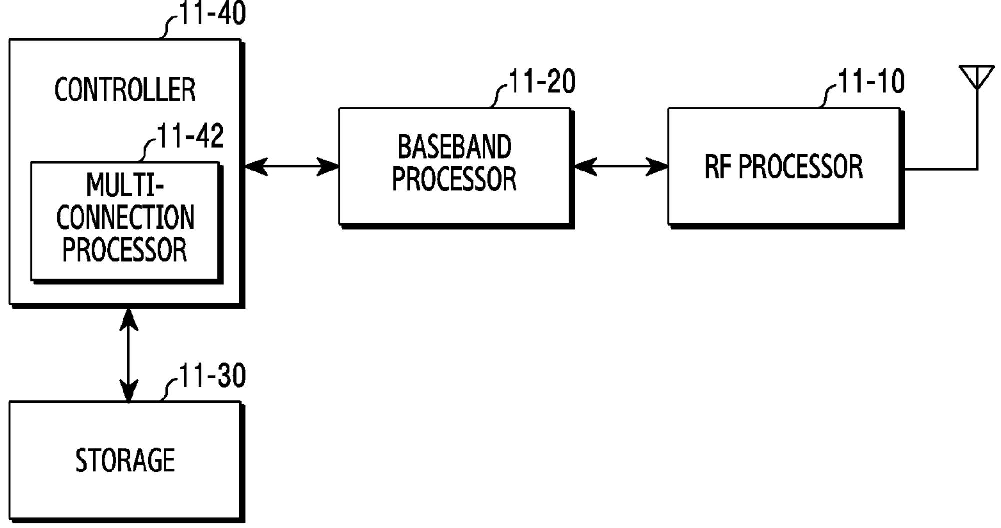
FIG. 11 illustrates a block diagram of a terminal structure to which the present disclosure is applied.

FIG. 11 is a block diagram illustrating an internal structure of a UE to which the present disclosure is applied.

Referring to FIG. 11, the UE includes a radio frequency (RF) processor 11-10, a baseband processor 11-20, a storage 11-30, and a controller 11-40.

The RF processor 11-10 performs a function for transmitting and receiving a signal over a radio ireless channel, such as signal band conversion and amplification. That is, the RF processor 11-10 up-converts a baseband signal provided from the baseband processor 11-20 into an RF band signal, transmits the RF band signal via an antenna, and down-converts an RF band signal received through the antenna into a baseband signal. For example, the RF processor 11-10 may include a transmit filter, a receive filter, an amplifier, a mixer, an oscillator, a digital to analog converter (DAC), an analog to digital converter (ADC), and so forth. Although only one antenna is illustrated in FIG. 11, the UE may include a plurality of antennas. The RF processor 11-10 may include a plurality of RF chains. Further, the RF processor 11-10 may perform beamforming. For the beamforming, the RF processor 11-10 may adjust phases and magnitudes of signals transmitted and received via the plurality of antennas or antenna elements. The RF processor 11-10 may perform MIMO, and receive several layers in performing MIMO operations.

The baseband processor 11-20 performs a conversion function between a baseband signal and a bitstream according to a physical layer standard of the system. For example, in data transmission, the baseband processor 11-20 generates complex symbols by encoding and modulating a transmit bitstream. In data reception, the baseband processor 11-20 recovers a received bitstream by demodulating and decoding the baseband signal provided from the RF processor 11-10. For example, according to the OFDM, in data transmission, the baseband processor 11-20 generates complex symbols by encoding and modulating a transmit bitstream, map the complex symbols to subcarriers, and construct OFDM symbols through inverse fast Fourier transform (IFFT) and cyclic prefix (CP) insertion. Also, in data reception, the baseband processor 11-20 divides the baseband signal provided from the RF processor 11-10 into OFDM symbols, recovers signals mapped to the subcarriers through FFT, and recovers the received bitstream by demodulation and decoding the signals.

The baseband processor 11-20 and the RF processor 11-10 transmit and receive a signal as described above. Accordingly, the baseband processor 11-20 and the RF processor 11-10 may be referred to as a transmitter, a receiver, a transceiver, or a communicator. Further, at least one of the baseband processor 11-20 or the RF processor 11-10 may include a plurality of communication modules for supporting a plurality of different radio access technologies. In addition, at least one of the baseband processor 11-20 and the RF processor 11-10 may include a plurality of communication modules for processing signals in different frequency bands. For example, the different radio access technologies may include a wireless local area network (LAN) (e.g., IEEE 802.11), a cellular network (e.g., LTE), and the like. In addition, the different frequency bands may include a super high frequency (SHF, e.g., 2.5 GHz, 5 GHz) band, and a millimeter wave (mmWave) (e.g., 60 GHz) band.

The storage 11-30 stores data such as a basic program for operations of the UE, an application program, and configuration information. In particular, the storage 11-30 may store information related to a second access node which performs wireless communication using a second radio access technology. The storage 11-30 provides the stored data at a request of the controller 11-40.

The controller 11-40 controls general operations of the UE. For example, the controller 11-40 may transmit and receive a signal through the baseband processor 11-20 and the RF processor 11-10. The controller 11-40 records and reads data in and from the storage 11-30. For doing so, the controller 11-40 may include at least one processor. For example, the controller 11-40 may include a communication processor (CP) for performing control for communication and an application processor (AP) for controlling a higher layer such as an application program. In addition, the controller 11-40 may further include a multi-connection processor 11-42 for supporting multi-connection.

Figure 12:
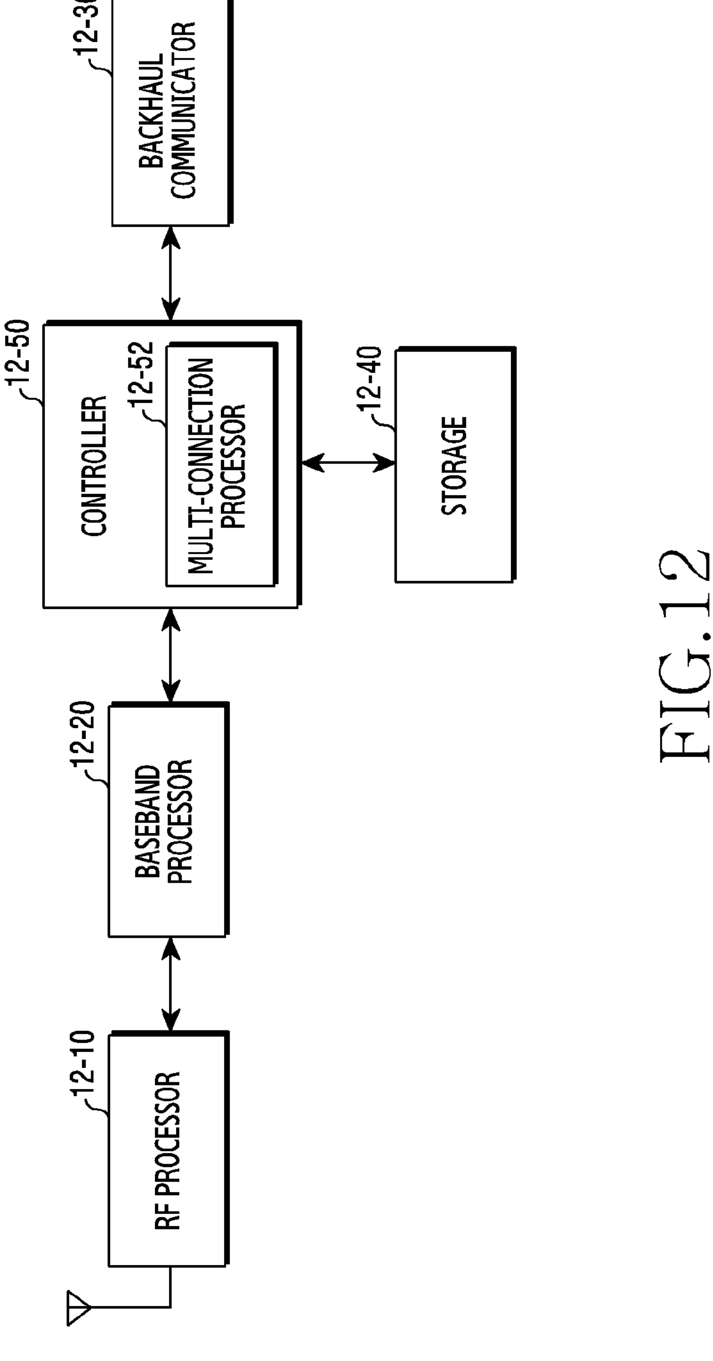
FIG. 12 illustrates a block diagram of a base station structure to which the present disclosure is applied.

FIG. 12 illustrates a block diagram of a configuration of an NR gNB according to the present disclosure.

As shown in FIG. 12, the gNB includes an RF processor 12-10, a baseband processor 12-20, a backhaul communicator 12-30, a storage 12-40, and a controller 12-50.

The RF processor 12-10 performs a function for transmitting and receiving a signal over a radio channel, such as band conversion and amplification. That is, the RF processor 12-10 up-converts a baseband signal provided from the baseband processor 12-20 into an RF band signal, transmits the RF band signal via an antenna, and down-converts an RF band signal received through the antenna into a baseband signal. For example, the RF processor 12-10 may include a transmit filter, a receive filter, an amplifier, a mixer, an oscillator, a DAC, an ADC, and so forth. Although only one antenna is illustrated in FIG. 12, the gNB may also include a plurality of antennas. The RF processor 12-10 may include a plurality of RF chains. Further, the RF processor 12-10 may perform the beamforming. For the beamforming, the RF processor 12-10 may adjust phases and magnitudes of signals transmitted and received through the plurality of antennas or antenna elements. The RF processor 12-10 may perform downward MIMO operations by transmitting one or more layers.

The baseband processor 12-20 performs a conversion function between a baseband signal and a bitstream according to a physical layer standard of a first radio access technology. For example, in data transmission, the baseband processor 12-20 generates complex symbols by encoding and modulating a transmit bitstream. In data reception, the baseband processor 12-20 recovers a received bitstream by demodulating and decoding the baseband signal provided from the RF processor 12-10. For example, according to the OFDM, in data transmission, the baseband processor 12-20 generates complex symbols by encoding and modulating a transmit bitstream, map the complex symbols to subcarriers, and construct OFDM symbols through the IFFT and the CP insertion. Also, in data reception, the baseband processor 12-20 divides the baseband signal provided from the RF processor 12-10 into OFDM symbols, recovers signals mapped to the subcarriers through the FFT, and recovers the received bitstream by demodulation and decoding the signals. The baseband processor 12-20 and the RF processor 12-10 transmit and receive a signal as described above. Hence, the baseband processor 12-20 and the RF processor 12-10 may be referred to as a transmitter, a receiver, a transceiver, a communicator, or a wireless communicator.

The backhaul communicator 12-30 provides an interface for communicating with other nodes in a network. That is, the backhaul communicator 12-30 converts a bitstream transmitted to another node, for example, an auxiliary gNB, a core network, and so on, into a physical signal, and converts a physical signal received from the another node into a bitstream.

The storage 12-40 stores data such as a basic program for operations of the main gNB, an application program, and configuration information. In particular, the storage 12-40 may store information of a bearer allocated to the connected UE, and a measurement result reported from the connected UE. The storage 12-40 may store information used to determine whether to provide or stop multiple connections to the UE. The storage 12-40 provides the stored data at a request of the controller 12-50.

The controller 12-50 controls general operations of the main gNB. For example, the controller 12-50 may transmit and receive a signal through the baseband processor 12-20 and the RF processor 12-10 or the backhaul communicator 12-30. The controller 12-50 records and reads data in and from the storage 12-40. For doing so, the controller 12-50 may include at least one processor. In addition, the controller 12-50 may further include a multi-connection processor 12-52 for supporting multiple connections.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage device, and a magnetic cassette. Alternatively, it may be stored to a memory combining part or all of those recording media. A plurality of memories may be included.

Also, the program may be stored in an attachable storage device accessible via a communication network such as internet, intranet, LAN, wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure. For example, some or whole of some embodiment may be combined with some or all of one or more other embodiments, which also corresponds to the embodiment of the present disclosure. Therefore, the scope of the present disclosure is not limited and defined by the described embodiment, and is defined by not only the scope of the claims as below but also their equivalents.

What is claimed is:

1. A method performed by a user equipment (UE) in a wireless communication system, the method comprising:

receiving, from a base station, a radio resource control (RRC) message configuring a plurality of beam failure detection (BFD) sets, wherein at least one BFD reference signal (BFD-RS) of a BFD set among the plurality of BFD sets is activated if a number of the at least one BFD-RS of the BFD set is smaller than or equal to a threshold value, and the at least one BFD-RS of the BFD set among the plurality of BFD sets is deactivated if the number of the at least one BFD-RS of the BFD set is larger than the threshold value; and receiving, from the base station, a medium access control (MAC) control element (CE) for indicating a first updated BFD-RS for a first BFD set among the plurality of BFD sets and a second updated BFD-RS for a second BFD set among the plurality of BFD sets, wherein the MAC CE includes a first BFD-RS identifier (ID) for the first BFD set, a first S field indicating whether a second BFD-RS ID is present for the first BFD set, a first BFD-RS ID for the second BFD set, and a second S field indicating whether a second BFD-RS ID is present for the second BFD set, wherein the MAC CE includes the second BFD-RS ID for the first BFD set if a bit of the first S field is set to 1 and the MAC CE does not include the second BFD-RS ID for the first BFD set if the bit of the first S field is set to 0, and wherein the MAC CE includes the second BFD-RS ID for the second BFD set if a bit of the second S field is set to 1 and the MAC CE does not include the second BFD-RS ID for the second BFD set if the bit of the second S field is set to 0.

2. The method of claim 1, further comprising:

receiving, from the base station, the first updated BFD-RS of the first BFD set and the second updated BFD-RS of the second BFD set, based on the MAC CE.

3. The method of claim 1, further comprising:

receiving, from the base station, an activated BFD-RS configured by the RRC message, before receiving the MAC CE.

4. The method of claim 1, wherein the threshold value includes a maximum number of BFD-RSs that are able to be monitored by the UE, and the threshold value is 1 or 2.

5. A method performed by a base station in a wireless communication system, the method comprising:

transmitting, to a user equipment (UE), a radio resource control (RRC) message configuring a plurality of beam failure detection (BFD) sets, wherein at least one BFD reference signal (BFD-RS) of a BFD set among the plurality of BFD sets is activated if a number of the at least one BFD-RS of the BFD set is smaller than or equal to a threshold value, and the at least one BFD-RS of the BFD set among the plurality of BFD sets is deactivated if the number of the at least one BFD-RS of the BFD set is larger than the threshold value; and transmitting, to the UE, a medium access control (MAC) control element (CE) for indicating a first updated BFD-RS for a first BFD set among the plurality of BFD sets and a second updated BFD-RS for a second BFD set among the plurality of BFD sets, wherein the MAC CE includes a first BFD-RS identifier (ID) for the first BFD set, a first S field indicating whether a second BFD-RS ID is present for the first BFD set, a first BFD-RS ID for the second BFD set, and a second S field indicating whether a second BFD-RS ID is present for the second BFD set, wherein the MAC CE includes the second BFD-RS ID for the first BFD set if a bit of the first S field is set to 1 and the MAC CE does not include the second BFD-RS ID for the first BFD set if the bit of the first S field is set to 0, and wherein the MAC CE includes the second BFD-RS ID for the second BFD set if a bit of the second S field is set to 1 and the MAC CE does not include the second BFD-RS ID for the second BFD set if the bit of the second S field is set to 0.

6. The method of claim 5, further comprising:

transmitting, to the UE, the first updated BFD-RS of the first BFD set and the second updated BFD-RS of the second BFD set, based on the MAC CE.

7. The method of claim 5, further comprising:

transmitting, to the UE, an activated BFD-RS configured by the RRC message, before transmitting the MAC CE.

8. The method of claim 5, wherein the threshold value includes a maximum number of BFD-RSs that are able to be monitored, and the threshold value is 1 or 2.

9. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, a radio resource control (RRC) message configuring a plurality of beam failure detection (BFD) sets, wherein at least one BFD reference signal (BFD-RS) of a BFD set among the plurality of BFD sets is activated if a number of the at least one BFD-RS of the BFD set is smaller than or equal to a threshold value, and the at least one BFD-RS of the BFD set among the plurality of BFD sets is deactivated if the number of the at least one BFD-RS of the BFD set is larger than the threshold value, and receive, from the base station, a medium access control (MAC) control element (CE) for indicating a first updated BFD-RS for a first BFD set among the plurality of BFD sets and a second updated BFD-RS for a second BFD set among the plurality of BFD sets, wherein the MAC CE includes a first BFD-RS identifier (ID) for the first BFD set, a first S field indicating whether a second BFD-RS ID is present for the first BFD set, a first BFD-RS ID for the second BFD set, and a second S field indicating whether a second BFD-RS ID is present for the second BFD set, wherein the MAC CE includes the second BFD-RS ID for the first BFD set if a bit of the first S field is set to 1 and the MAC CE does not include the second BFD-RS ID for the first BFD set if the bit of the first S field is set to 0, and wherein the MAC CE includes the second BFD-RS ID for the second BFD set if a bit of the second S field is set to 1 and the MAC CE does not include the second BFD-RS ID for the second BFD set if the bit of the second S field is set to 0.

10. The UE of claim 9, wherein the instructions further cause the UE to:

receive, from the base station, the first updated BFD-RS of the first BFD set and the second updated BFD-RS of the second BFD set, based on the MAC CE.

11. The UE of claim 9, wherein the instructions further cause the UE to:

receive, from the base station, an activated BFD-RS configured by the RRC message, before receiving the MAC CE.

12. The UE of claim 9, wherein the threshold value includes a maximum number of BFD-RSs that are able to be monitored by the UE, and the threshold value is 1 or 2.

13. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), a radio resource control (RRC) message configuring a plurality of beam failure detection (BFD) sets, at least one BFD reference signal (BFD-RS) of a BFD set among the plurality of BFD sets is activated if a number of the at least one BFD-RS of the BFD set is smaller than or equal to a threshold value, and the at least one BFD-RS of the BFD set among the plurality of BFD sets is deactivated if the number of the at least one BFD-RS of the BFD set is larger than the threshold value, and transmit, to the UE, a medium access control (MAC) control element (CE) for indicating a first updated BFD-RS for a first BFD set among the plurality of BFD sets and a second updated BFD-RS for a second BFD set among the plurality of BFD sets, wherein the MAC CE includes a first BFD-RS identifier (ID) for the first BFD set, a first S field indicating whether a second BFD-RS ID is present for the first BFD set, a first BFD-RS ID for the second BFD set, and a second S field indicating whether a second BFD-RS ID is present for the second BFD set, wherein the MAC CE includes the second BFD-RS ID for the first BFD set if a bit of the first S field is set to 1 and the MAC CE does not include the second BFD-RS ID for the first BFD set if the bit of the first S field is set to 0, and wherein the MAC CE includes the second BFD-RS ID for the second BFD set if a bit of the second S field is set to 1 and the MAC CE does not include the second BFD-RS ID for the second BFD set if the bit of the second S field is set to 0.

14. The base station of claim 13, wherein the instructions further cause the base station to:

transmit, to the UE, the first updated BFD-RS of the first BFD set and the second updated BFD-RS of the second BFD set, based on the MAC CE.

15. The base station of claim 13, wherein the instructions further cause the base station to:

transmit, to the UE, an activated BFD-RS configured by the RRC message, before transmitting the MAC CE.

16. The base station of claim 13, wherein the threshold value includes a maximum number of BFD-RSs that are able to be monitored, and the threshold value is 1 or 2.

* * * * *